(12) United States Patent
Friedlander et al.

(10) Patent No.: US 12,423,374 B2
(45) Date of Patent: Sep. 23, 2025

(54) SYSTEMS AND METHODS FOR STOCHASTIC OPTIMIZATION OF A ROBUST INFERENCE PROBLEM

(71) Applicant: 1QB Information Technologies Inc., Vancouver (CA)

(72) Inventors: Michael Paul Friedlander, Vancouver (CA); Pooya Ronagh, Vancouver (CA); Behrooz Sepehry, Vancouver (CA)

(73) Assignee: 1QB INFORMATION TECHNOLOGIES INC., Vancover (CA)

( * ) Notice: Subject to any disclaimer, the term of this patent is extended or adjusted under 35 U.S.C. 154(b) by 582 days.

(21) Appl. No.: 16/888,419

(22) Filed: May 29, 2020

(65) Prior Publication Data

US 2020/0364597 A1 Nov. 19, 2020

Related U.S. Application Data

(63) Continuation of application No. PCT/CA2018/051534, filed on Nov. 30, 2018.

(60) Provisional application No. 62/716,041, filed on Aug. 8, 2018, provisional application No. 62/593,563, filed on Dec. 1, 2017.

(51) Int. Cl.
| | | |
|---|---|---|
| *G06F 17/11* | (2006.01) | |
| *G06F 17/18* | (2006.01) | |
| *G06F 18/211* | (2023.01) | |
| *G06F 18/213* | (2023.01) | |
| *G06N 3/02* | (2006.01) | |

(Continued)

(52) U.S. Cl.
CPC .............. *G06F 17/11* (2013.01); *G06F 17/18* (2013.01); *G06F 18/211* (2023.01); *G06F 18/213* (2023.01); *G06N 3/02* (2013.01); *G06N 7/08* (2013.01); *G06N 20/10* (2019.01)

(58) Field of Classification Search
CPC .......... G06N 7/08; G06N 10/00; G06N 10/20; G06N 10/40; G06N 10/60; G06N 10/70; G06N 10/80; G06N 20/10; G06N 3/02; G06F 17/18; G06F 17/11; G06F 18/211; G06F 18/213; G06K 9/6228; G06K 9/6232
See application file for complete search history.

(56) References Cited

U.S. PATENT DOCUMENTS

| | | |
|---|---|---|
| 6,221,592 B1 | 4/2001 | Schwartz et al. |
| 7,113,967 B2 | 9/2006 | Cleve et al. |

(Continued)

FOREIGN PATENT DOCUMENTS

| | | |
|---|---|---|
| CA | 2840958 A1 | 1/2013 |
| CA | 2881033 A1 | 4/2015 |

(Continued)

OTHER PUBLICATIONS

Pedregosa, Fabian. "Hyperparameter optimization with approximate gradient." International conference on machine learning. PMLR, 2016. (Year: 2016).*

(Continued)

*Primary Examiner* — Markus A. Vasquez
(74) *Attorney, Agent, or Firm* — WILSON SONSINI GOODRICH & ROSATI

(57) ABSTRACT

The present disclosure provides methods and systems for stochastic optimization of a robust inference problem using a sampling device.

31 Claims, 2 Drawing Sheets

(51) Int. Cl.
  *G06N 7/08* (2006.01)
  *G06N 20/10* (2019.01)

(56) References Cited

U.S. PATENT DOCUMENTS

| | | |
|---|---|---|
| 7,135,701 B2 | 11/2006 | Amin et al. |
| 7,234,144 B2 | 6/2007 | Wilt et al. |
| 7,418,283 B2 | 8/2008 | Amin et al. |
| 7,533,068 B2 | 5/2009 | Maassen van den Brink et al. |
| 7,619,437 B2 | 11/2009 | Thom et al. |
| 7,639,035 B2 | 12/2009 | Berkley |
| 7,660,533 B1 | 2/2010 | Meyers et al. |
| 7,805,079 B1 | 9/2010 | Meyers et al. |
| 7,877,333 B2 | 1/2011 | Macready |
| 7,898,282 B2 | 3/2011 | Harris et al. |
| 7,984,012 B2 | 7/2011 | Coury et al. |
| 8,008,942 B2 | 8/2011 | van den Brink et al. |
| 8,126,649 B2 | 2/2012 | Frasch et al. |
| 8,175,995 B2 | 5/2012 | Amin |
| 8,195,596 B2 | 6/2012 | Rose et al. |
| 8,195,726 B2 | 6/2012 | Macready et al. |
| 8,219,605 B2 | 7/2012 | Cowlishaw et al. |
| 8,230,432 B2 | 7/2012 | Bryant et al. |
| 8,244,504 B1 | 8/2012 | Jacobs |
| 8,244,662 B2 | 8/2012 | Coury et al. |
| 8,283,943 B2 | 10/2012 | van den Brink et al. |
| 8,374,828 B1 | 2/2013 | Jacobs et al. |
| 8,421,053 B2 | 4/2013 | Bunyk et al. |
| 8,503,885 B2 | 8/2013 | Meyers et al. |
| 8,655,828 B2 | 2/2014 | Rose |
| 8,832,165 B2 | 9/2014 | Allen et al. |
| 9,537,953 B1 | 1/2017 | Dadashikelayeh et al. |
| 9,660,859 B1 | 5/2017 | Dadashikelayeh et al. |
| 9,727,824 B2 | 8/2017 | Rose et al. |
| 9,870,273 B2 | 1/2018 | Dadashikelayeh et al. |
| 9,881,256 B2 | 1/2018 | Hamze et al. |
| 10,044,638 B2 | 8/2018 | Dadashikelayeh et al. |
| 10,152,358 B2 | 12/2018 | Dadashikelayeh et al. |
| 10,223,084 B1 | 3/2019 | Dunn |
| 10,325,218 B1 | 6/2019 | Zeng et al. |
| 10,339,466 B1 | 7/2019 | Ding et al. |
| 10,346,748 B2 | 7/2019 | Aspuru-Guzik et al. |
| 10,469,087 B1 | 11/2019 | Granade et al. |
| 10,484,479 B2 | 11/2019 | Johnson et al. |
| 10,558,932 B1 | 2/2020 | Neven et al. |
| 10,614,370 B2 | 4/2020 | Johnson et al. |
| 10,713,582 B2 | 7/2020 | Dadashikelayeh |
| 10,929,294 B2 | 2/2021 | Brahm et al. |
| 11,017,289 B2 | 5/2021 | Crawford et al. |
| 11,196,775 B1 | 12/2021 | Badawy et al. |
| 11,205,275 B2 | 12/2021 | Oami et al. |
| 11,514,134 B2 | 11/2022 | Ronagh et al. |
| 2003/0005068 A1 | 1/2003 | Nickel et al. |
| 2003/0023707 A1 | 1/2003 | Ryan |
| 2003/0121028 A1 | 6/2003 | Coury et al. |
| 2004/0254735 A1 | 12/2004 | Horn et al. |
| 2004/0267916 A1 | 12/2004 | Chambliss et al. |
| 2005/0027458 A1 | 2/2005 | Merz et al. |
| 2005/0182614 A1 | 8/2005 | Meredith |
| 2005/0187844 A1 | 8/2005 | Chalermkraivuth et al. |
| 2005/0250651 A1 | 11/2005 | Amin et al. |
| 2005/0273306 A1 | 12/2005 | Hilton et al. |
| 2006/0221978 A1 | 10/2006 | Venkatachalam |
| 2006/0225165 A1 | 10/2006 | Maassen Van Den Brink et al. |
| 2007/0177634 A1 | 8/2007 | Beausoleil et al. |
| 2007/0180586 A1 | 8/2007 | Amin |
| 2007/0215862 A1 | 9/2007 | Beausoleil et al. |
| 2007/0239366 A1 | 10/2007 | Hilton et al. |
| 2008/0059547 A1 | 3/2008 | Taylor |
| 2008/0065573 A1 | 3/2008 | Macready |
| 2008/0186918 A1 | 8/2008 | Tinnakornsrisuphap et al. |
| 2008/0215850 A1 | 9/2008 | Berkley et al. |
| 2008/0218519 A1 | 9/2008 | Coury et al. |
| 2008/0262990 A1 | 10/2008 | Kapoor et al. |
| 2008/0313430 A1 | 12/2008 | Bunyk |
| 2009/0050357 A1 | 2/2009 | Suzuki |
| 2009/0070402 A1 | 3/2009 | Rose et al. |
| 2009/0078932 A1 | 3/2009 | Amin |
| 2009/0164435 A1 | 6/2009 | Routt |
| 2009/0182542 A9 | 7/2009 | Hilton et al. |
| 2009/0203449 A1 | 8/2009 | Douceur et al. |
| 2009/0306902 A1 | 12/2009 | Lemmen et al. |
| 2009/0325694 A1 | 12/2009 | Beckman et al. |
| 2010/0076913 A1 | 3/2010 | Yang et al. |
| 2010/0261481 A1 | 10/2010 | Resende et al. |
| 2010/0306142 A1 | 12/2010 | Amin |
| 2011/0047201 A1 | 2/2011 | Macready et al. |
| 2011/0231462 A1 | 9/2011 | Macready et al. |
| 2011/0238378 A1 | 9/2011 | Allen et al. |
| 2011/0238855 A1 | 9/2011 | Korsunsky et al. |
| 2011/0296229 A1 | 12/2011 | Cowlishaw et al. |
| 2012/0072579 A1 | 3/2012 | Teather |
| 2012/0084242 A1 | 4/2012 | Levin |
| 2012/0159506 A1 | 6/2012 | Barham et al. |
| 2012/0215821 A1 | 8/2012 | Macready et al. |
| 2012/0240185 A1 | 9/2012 | Kapoor et al. |
| 2012/0253926 A1 | 10/2012 | Chen et al. |
| 2012/0254586 A1 | 10/2012 | Amin et al. |
| 2012/0278374 A1 | 11/2012 | Cowlishaw et al. |
| 2012/0326720 A1 | 12/2012 | Gambetta et al. |
| 2013/0026183 A1 | 1/2013 | Foster |
| 2013/0144925 A1 | 6/2013 | Macready et al. |
| 2013/0263131 A1 | 10/2013 | Beda, III et al. |
| 2013/0308956 A1 | 11/2013 | Meyers et al. |
| 2013/0336472 A1 | 12/2013 | Fahlgren et al. |
| 2014/0025606 A1 | 1/2014 | Macready |
| 2014/0067342 A1 | 3/2014 | Calderon |
| 2014/0067808 A1 | 3/2014 | Narang et al. |
| 2014/0122702 A1 | 5/2014 | Jung et al. |
| 2014/0123325 A1 | 5/2014 | Jung et al. |
| 2014/0187427 A1* | 7/2014 | Macready ............. B82Y 10/00 706/46 |
| 2014/0214257 A1 | 7/2014 | Williams et al. |
| 2014/0237276 A1 | 8/2014 | Machnicki et al. |
| 2014/0250288 A1 | 9/2014 | Roy |
| 2014/0258730 A1 | 9/2014 | Stecher |
| 2014/0324933 A1 | 10/2014 | Macready et al. |
| 2014/0337612 A1 | 11/2014 | Williams |
| 2014/0344322 A1 | 11/2014 | Ranjbar |
| 2014/0365843 A1 | 12/2014 | Ashikhmin |
| 2014/0379924 A1 | 12/2014 | Das et al. |
| 2015/0006443 A1 | 1/2015 | Rose et al. |
| 2015/0032991 A1 | 1/2015 | Lanting et al. |
| 2015/0032993 A1 | 1/2015 | Amin et al. |
| 2015/0055961 A1 | 2/2015 | Meyers et al. |
| 2015/0106413 A1 | 4/2015 | Ronagh |
| 2015/0111754 A1 | 4/2015 | Harris et al. |
| 2015/0120551 A1 | 4/2015 | Jung et al. |
| 2015/0120555 A1 | 4/2015 | Jung et al. |
| 2015/0142398 A1 | 5/2015 | Miller, III et al. |
| 2015/0169746 A1 | 6/2015 | Hatami-Hanza |
| 2015/0178349 A1 | 6/2015 | Niewodniczanski et al. |
| 2015/0193692 A1 | 7/2015 | Israel |
| 2015/0205759 A1 | 7/2015 | Israel et al. |
| 2015/0220852 A1 | 8/2015 | Hatami-Hanza |
| 2015/0227559 A1 | 8/2015 | Hatami-Hanza |
| 2015/0262074 A1 | 9/2015 | Bruestle et al. |
| 2015/0269124 A1 | 9/2015 | Hamze et al. |
| 2015/0269243 A1 | 9/2015 | Kobayashi |
| 2015/0332994 A1 | 11/2015 | Mallik et al. |
| 2015/0349960 A1 | 12/2015 | Bagley |
| 2015/0358251 A1 | 12/2015 | Varga et al. |
| 2015/0363358 A1* | 12/2015 | Ronagh .................... G06N 5/01 708/490 |
| 2015/0363708 A1 | 12/2015 | Amin et al. |
| 2016/0026183 A1 | 1/2016 | Williams et al. |
| 2016/0071021 A1 | 3/2016 | Raymond |
| 2016/0112066 A1 | 4/2016 | Ashikhmin |
| 2016/0132785 A1 | 5/2016 | Amin et al. |
| 2016/0162798 A1 | 6/2016 | Marandi et al. |
| 2016/0171368 A1 | 6/2016 | Aspuru-Guzik et al. |
| 2016/0217759 A1 | 7/2016 | Morita |
| 2016/0224515 A1 | 8/2016 | Ronagh et al. |
| 2016/0321559 A1 | 11/2016 | Rose et al. |

(56) References Cited

U.S. PATENT DOCUMENTS

| | | |
|---|---|---|
| 2016/0328253 A1 | 11/2016 | Majumdar |
| 2016/0328659 A1 | 11/2016 | Mohseni et al. |
| 2016/0338075 A1 | 11/2016 | Mckibben |
| 2016/0342891 A1 | 11/2016 | Ross et al. |
| 2017/0011305 A1 | 1/2017 | Williams |
| 2017/0017894 A1 | 1/2017 | Lanting et al. |
| 2017/0060642 A1 | 3/2017 | Castellano et al. |
| 2017/0109605 A1 | 4/2017 | Ahn |
| 2017/0147303 A1 | 5/2017 | Amy et al. |
| 2017/0147695 A1 | 5/2017 | Shih |
| 2017/0214701 A1 | 7/2017 | Hasan |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 | 9/2017 | Thom et al. |
| 2017/0255872 A1 | 9/2017 | Hamze et al. |
| 2017/0286852 A1 | 10/2017 | Rezaie et al. |
| 2017/0286858 A1 | 10/2017 | La et al. |
| 2017/0300808 A1 | 10/2017 | Ronagh et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |
| 2017/0372427 A1 | 12/2017 | Johnson et al. |
| 2017/0373940 A1 | 12/2017 | Shahab et al. |
| 2018/0014970 A1 | 1/2018 | Conde De Paiva et al. |
| 2018/0039903 A1 | 2/2018 | Mosca et al. |
| 2018/0091440 A1 | 3/2018 | Dadashikelayeh et al. |
| 2018/0096085 A1 | 4/2018 | Rubin |
| 2018/0107526 A1 | 4/2018 | Dadashikelayeh et al. |
| 2018/0114138 A1 | 4/2018 | Monroe et al. |
| 2018/0204126 A1 | 7/2018 | Galle |
| 2018/0218279 A1 | 8/2018 | Lechner et al. |
| 2018/0218281 A1 | 8/2018 | Reinhardt et al. |
| 2018/0232649 A1 | 8/2018 | Wiebe et al. |
| 2018/0246851 A1 | 8/2018 | Zaribafiyan et al. |
| 2018/0260730 A1 | 9/2018 | Reagor et al. |
| 2018/0267937 A1 | 9/2018 | Pelc et al. |
| 2018/0308000 A1 | 10/2018 | Dukatz et al. |
| 2018/0308007 A1 | 10/2018 | Amin et al. |
| 2018/0314970 A1 | 11/2018 | Harris et al. |
| 2018/0375790 A1 | 12/2018 | Dadashikelayeh et al. |
| 2019/0009581 A1 | 1/2019 | Schalk et al. |
| 2019/0087237 A1 | 3/2019 | Dadashikelayeh et al. |
| 2019/0095811 A1 | 3/2019 | Antonio et al. |
| 2019/0179871 A1 | 6/2019 | Granade et al. |
| 2019/0205790 A1 | 7/2019 | Dukatz et al. |
| 2019/0251213 A1 | 8/2019 | Bishop et al. |
| 2019/0370680 A1 | 12/2019 | Novotny |
| 2019/0378047 A1 | 12/2019 | Pistoia et al. |
| 2020/0005186 A1 | 1/2020 | Romero et al. |
| 2020/0057957 A1 | 2/2020 | Johnson et al. |
| 2020/0090072 A1 | 3/2020 | Troyer et al. |
| 2020/0104740 A1 | 4/2020 | Cao |
| 2020/0125568 A1 | 4/2020 | Idicula et al. |
| 2020/0143910 A1 | 5/2020 | Noori et al. |
| 2020/0191943 A1 | 6/2020 | Wu et al. |
| 2020/0279187 A1 | 9/2020 | Huang et al. |
| 2020/0394537 A1 | 12/2020 | Wang et al. |
| 2020/0401920 A1 | 12/2020 | Killoran et al. |
| 2020/0410343 A1 | 12/2020 | Niu et al. |
| 2021/0103847 A1 | 4/2021 | Akzam |
| 2021/0125094 A1 | 4/2021 | Chamberland et al. |
| 2021/0166133 A1 | 6/2021 | Ronagh et al. |
| 2021/0166148 A1 | 6/2021 | Matsuura et al. |
| 2021/0279260 A1 | 9/2021 | Oberoi et al. |
| 2021/0287124 A1 | 9/2021 | Ronagh et al. |
| 2021/0289020 A1* | 9/2021 | Rolfe ............ G06N 7/01 |
| 2021/0304052 A1 | 9/2021 | Pant |
| 2021/0374611 A1 | 12/2021 | Ronagh et al. |
| 2022/0101172 A1 | 3/2022 | Lee et al. |
| 2022/0107927 A1 | 4/2022 | Vedaie et al. |
| 2022/0366314 A1 | 11/2022 | Vall-Llosera et al. |
| 2023/0067878 A1 | 3/2023 | Ronagh et al. |
| 2023/0077665 A1 | 3/2023 | Kuttimalai et al. |
| 2023/0104058 A1 | 4/2023 | Hopfmueller et al. |
| 2023/0222173 A1 | 7/2023 | Ronagh et al. |

FOREIGN PATENT DOCUMENTS

| | | |
|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| CN | 112034842 A | 12/2020 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017131081 A1 | 8/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017214717 A1 | 12/2017 |
| WO | WO-2018058061 A1 | 3/2018 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |
| WO | WO-2023242744 A1 | 12/2023 |

OTHER PUBLICATIONS

Wikipedia. Automatic Differentiation. Article from Nov. 23, 2016. https://en.wikipedia.org/w/index.php?title=Automatic_differentiation&oldid=751071969. Accessed Jan. 29, 2023. (Year: 2016).*

Mao, Jianchang, and Anil K. Jain. "Artificial neural networks for feature extraction and multivariate data projection." IEEE transactions on neural networks 6.2 (1995): 296-317. (Year: 1995).*

Sakaguchi, Hiromasa, et al. "Boltzmann sampling by degenerate optical parametric oscillator network for structure-based virtual screening." Entropy 18.10 (2016): 365. (Year: 2016).*

(56) References Cited

OTHER PUBLICATIONS

Wikipedia. "Softmax function". Article version as accessed from Wayback Machine on Aug. 31, 2017. (Year: 2017).*
Amin et al.: Quantum Boltzmann Machine. Phys. Rev. X8, 021050 [arXiv:1601.02036 1-11] (2018).
European Patent Application No. 18884196.9 Extended European Search Report dated Jul. 16, 2021.
Gwennap: Groq Rocks Neural Networks. The Linley Group Microprocessor Report www.groq.com/groq-tsp-leads-in-inference-performance/ [1-5] (2020).
Izmaylov et al.: Revising the measurement process in the variational quantum eigensolver: is it possible to reduce the No. of separately measured operators? Chem Sci. 10(13):3746-3755 (2019).
Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).
Kempe et al.: The Complexity of the Local Hamiltonian Problem. SIAM Journal of Computing. 35(5):1070-1097 Rev.2008 DOI: arXiv:quant-ph/0406180v2 [1-30] (2005).
Lemieux et al.: Efficient Quantum Walk Circuits for Metropolis-Hastings Algorithm. Quantum 4:287 [1-15] (2020).
Lemieux et al.: Resource estimate for quantum many-body ground-state preparation on a quantum computer. Physical Review A 103(5)052408 DOI:10.1103/PhysRevA.103.052408 [1-9] (2021).
Moll et al.: Quantum optimization using variational algorithms on near-term quantum devices. Quantum Sci. Technol. 3 030503 [1-17] (2018).
Nishikawa et al. Quantum Chemistry Grid/Gaussian Portal, Journal of the twenty second Annual Research Society, Japan Simulation Society, Jun. 18, 2003, pp. 369 to 372 (English Abstract).
Papamakarios: Comparison of Modern Stochastic Optimization Algorithms. Scholar article. [1-13] (2014) www.richtarik.org/papers/Papamakarios.pdf.
PCT/CA2021/050513 International Search Report and Written Opinion dated Jul. 14, 2021.
Temme et al.: Quantum metropolis sampling. Nature 471(7336):87-90 (2011).
Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).
Akama et al. Implementation of divide-and-conquer method including Hartree-Fock exchange interaction. J Comput Chem 28(12):2003-2012 (2007).
Alidaee et al. Solving the maximum edge weight clique problem via unconstrained quadratic programming. European Journal of Operational Research 181(2):592-597 (2007).
Anthony et al. Quadratization of symmetric pseudo-Boolean functions. Discrete Appl. Math. 203:1-12 (2016).
Aspuru-Guzik et al. Simulated Quantum Computation of Molecular Energies. Science 309:1704 (2005).
Assad et al. The quadratic minimum spanning tree problem. Naval Research Logistics 39:399-417 (1992).
Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet: (https://arxiv.org/pdf/1307.8041.pdf5).
Babbush. Towards Viable Quantum Computation for Chemistry, 2015, [Retrieved on Feb. 27, 2020]. Retrieved from the internet: < url: < a=""href="https://pdfs.sennanticscholar.org/aff0/5ecf5f58c2206c923b767d76bed7f43b2a66.pdf" > https://pdfs.sennanticscholar.org/aff0/5ecf5f58c2206c923b767d76bed7f43b2a66.pdf?ga=2.2412147.276222377.1582743768639821531.1551220934 376 Pages (1376) (2015) < /url: > .
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsl5/workshops/Proceedings%2000PLAS%202015.pdf (pp. 1-41) (2015).

Beasley. Integer programming solution methods. Available at URL: http://people.brunel.ac.uk/-mastjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bian et al. The Ising model: teaching an old problem new tricks. D-Wave Systems 2 (32 pgs.) (2010).
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Bravyi et al. Fermionic quantum computation. arXiv:quant-ph/0003137 (2000).
Buren. An Introduction to Quantum Computing using Cavity QED concepts. arXiv preprint arXiv:1210.6512 (2012).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
Carrasquilla. Machine learning for quantum matter. https://arxiv.org/pdf/2003.11040.pdf (2020).
Choi. Minor-embedding in adiabatic quantum computation: I. The parameter setting problem. Quantum Information Processing 7(5):193-209 (2008).
Clarke et al. Superconducting quantum bits. Nature 453(7198):1031 (2008).
Conway et al. An FPGA-based instrumentation platform for use at deep cryogenic temperatures. arxiv.org/abs/1509.06809 (2015).
Co-pending U.S. Appl. No. 16/809,473, filed Mar. 4, 2020.
Co-pending U.S. Appl. No. 16/811,479, filed Mar. 6, 2020.
Co-pending U.S. Appl. No. 16/888,446, filed May 29, 2020.
Co-pending U.S. Appl. No. 16/896,032, filed Jun. 8, 2020.
Cory et al. Nuclear magnetic resonance spectroscopy: an experimentally accessible paradigm for quantum computing. arXiv preprint quant-ph/97090 01(1997).
Cramer et al. Efficient quantum state tomography, Nature Communications 1:149 (2010).
Deutsch et al. Quantum computing with neutral atoms in an optical lattice. arXiv preprint quant-ph/0003022 (2000).
Durr et al. A Quantum Algorithm for Finding the Minimum. arXiv:quant-ph/9607014 (1996).
Dwave, Reverse Quantum Annealing for Local Refinement of Solutions, D-Wave Whitepaper Series, Nov. 9, 2017. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
Farhi et al. A Quantum Approximate Optimization Algorithm. arXiv:1411.4028 (2014).
Farhi et al. Quantum Adiabatic Evolution Algorithms versus Simulated Annealing.arXiv.org:quant ph/0201031 pp. 1-16 (2002).
Farhi et al. Quantum computation by adiabatic evolution. arXiv preprint quant-ph/0001106 (24 pgs) (2000).
Fedichkin et al. Novel coherent quantum bit using spatial quantization levels in semiconductor quantum dot. arXiv preprint quant-ph/0006097 (2000).
Fedorov et al. Exploring chemistry with the fragment molecular orbital method. Physical Chemistry Chemical Physics 14:7562-7577 (2012).
Freund. Applied Lagrange Duality for Constrained Optimization. Massachusetts Institute of Technology (pp. 1-35) (2004).
Geoffrion. Lagrangean relaxation for integer programming. Mathematics Programming Study 2, North-Holland Publishing Company (pp. 1-34) (1974).
Glover et al. Polynomial unconstrained binary optimisation Part 1, 2011, [Retrieved on Feb. 27, 2020]. Retrieved from the internet: < url: <a=""href="http://leedsfaculty.colorado.edu/glover/fred%20pubs/424%20%20%20Polynonnial" > http://leedsfaculty.colorado.edu/glover/fred%20pubs/424%20%20%20Polynonnial 25 Pages (231256) (2011) < /url: >.

(56) References Cited

OTHER PUBLICATIONS

Greene et al. Simulated annealing without rejected moves. IEEE Transactions on Computer-Aided Design of Integrated Circuits and Systems 5(1):221-228 (1986).
Grover. A fast quantum mechanical algorithm for database search. Proceedings of the 28th Annual ACM Symposium on the Theory of Computing (pp. 212-219) (1996).
Harneit. Spin Quantum Computing with Endohedral Fullerenes. arXiv preprint arXiv:1708.092 98 (2017).
Hukushima et al. Exchange Monte Carlo Method and Application to Spin Glass Simulations. Journal of the Physical Society of Japan 65:1604 (1996).
Imamog et al. Quantum information processing using quantum dot spins and cavity QED. arXiv preprint quant-ph/9904096 (1999).
Ishikawa. Transformation of General Binary MRF Minimization to the First-Order Case. IEEE Transactions on Pattern Analysis and Machine Intelligence. 33(6):1234-1249 (2011).
Johnson et al. Quantum annealing with manufactured spins. Nature 473(7346):194-198 (2011).
Jordan. Fast Quantum Algorithm for Numerical Gradient Estimation. Physical Review Letters 95:050501 (2015).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (6/27/ 27 and updated Aug. 30, 2016). Accessed May 17, 2017 and available from https://www.arxiv.org/pdf/1606.07797.pdf (25 pgs).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).
Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knizia et al. Density Matrix Embedding: a Simple Alternative to Dynamical Mean-Field Theory. Phys Rev Lett 109:186404 (2012).
Kobayashi et al. Chapter 5: Divide-and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Leuenberger et al. Quantum computing in molecular magnets. arXiv preprint cond-mat/0011415 (2001).
Levit et al. Free energy-based reinforcement learning using a quantum processor. Available at https://arxiv.org/pdf/1706.00074.pdf (May 2017) (8 pgs.).
Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
Lyon. Spin-based quantum computing using electrons on liquid helium. arXiv preprint cond-mat/030158 1 (2006).
Martinis et al. Rabi oscillations in a large Josephson-junction qubit. Physical Review Letters 89:117901 (2002).
Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).
Matsuura et al. VanQver: The Variational and Adiabatically Navigated Quantum Eigensolver. New Journal of Physics 22:053023 (2020).
McClean et al. The Theory of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available athttp://www.cs.amherst.edu/ccm/cf14-mcgeoch.pdf (11 pgs) (May 14-16, 2013).
McKiernan et al. Automated quantum programming via reinforcement learning for combinatorial optimization. Quantum Physics. arXiv.org quant-ph arXiv:1908.08054 (2019).
Metz. IBM Is Now Letting Anyone Play With Its Quantum Computer. WIRED. (5 pgs.) (May 2016).
Mnih et al. Asynchronous Methods for Deep Reinforcement Learning, in International Conference on Machine Learning, pp. 1928-1937 (2016).
Mnih et al. Playing Atari with Deep Reinforcement Learning. arXiv:1312.5602 (2013).
Montanaro. Quantum walk speedup of backtracking algorithms. arXiv:1509.02374v2 [quant-ph] (23 pgs) (2015).
Nafradi et al. Room temperature manipulation of long lifetime spins in metallic-like carbon nanospheres. Nat Commun 7:12232 (2016).
Nizovtsev et al. A quantum computer based on NV centers in diamond: optically detected nutations of single electron and nuclear spins. Optics and spectroscopy 99(2):233-244 (2005).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet: < https://www.cs.bgu.acilt--icaps15/workshops/Proceedings%2000PLAS%202015.pdf >.
Ohlsson et al. Quantum computer hardware based on rare-earth-ion-doped inorganic crystals. Optics Communications 201(1-3):71-77 (2002).
O'Malley et al. Scalable Quantum Simulation of Molecular Energies. Phys. Rev. X 6:031007 (2016).
Orus. Tensor networks for complex quantum systems. Nature Reviews Physics 1:538 (2019).
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.
PCT/CA2020/050641 International Search Report and Written Opinion dated Jul. 21, 2020.
PCT/IB2017/051038 International Search Report dated May 16, 2017.
PCT/IB2017/051224 International Search Report dated May 18, 2017.
Peruzzo et al. A variational eigenvalue solver on a quantum processor. arXiv:1304.3061 (2013).
Preskill. Quantum Computing in the NISQ era and beyond. Quantum 2:79 arXiv:1801.00862 (2018).

(56) References Cited

OTHER PUBLICATIONS

Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schulman et al. Proximal Policy Optimization Algorithms. arXiv:1707.06347 (2017).
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
Sloss et al. Evolutionary Algorithms Review, arXiv:1906.08870 (2019).
Sun et al. A single-photon switch and transistor enabled by a solid-state quantum memory. arXiv preprint quant-ph/1805.01964 (2018).
Suzuki. Fractal decomposition of exponential operators with applications to many-body theories and Monte Carlo simulations. Physics Letters A 146(6):319-323 (1990).
Svore et al. Toward a Software Architecture for Quantum Computing Design Tools. QPL 2004, pp. 127-144, Retrieved from the Internet: URL:https://www.microsoft.com/en-us/research/wp-content/uploads/2016/02/10Svore-Cros s-Aho-Chuang-Markov.pdf.
SymPy Python. Internals of the Polynomial Manupulation Module. Available online at http://docs.sympy.org/latest/modules/polys/internals.html (Accessed Jun. 2016) (136 pgs).
Tavares et al. New algorithms for Quadratic Unconstrained Binary Optimization (QUBO) with applications in engineering and social sciences. Rutgers University Community Repository. Dissertation -Retrieved from the Internet < URL: https://rucorelibrariessutgers.edu/rutgers-lib/25771/> on Feb. 2, 2018 (460 pgs) ( May 2008).
The D-Wave 2X™ Quantum Compute Technology Overview (12 pgs) (2015).
The D-Wave 2X Quantum Computer Technology Overview. D-Wave Systems Inc. 2015. http://www.dwavesys.com .
The D-Wave Quantum Computer. Brochure. D-Wave Systems Inc. 2016. http://www.dwavesys.com .
Tran et al. A hybrid quantum-classical approach to solving scheduling problems. AAAI Publications, Ninth Annual Symposium on Combinatorial Search. pp. 98-106 (SoCS 2016).
Trotter. On the product of semi-groups of operators. Proceedings of the American Mathematical Society 10(4):545-551 (1959).
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
Van Dam et al. How powerful is adiabatic quantum computation Proceedings 42nd IEEE Symposium on Foundations of Computer Science (pp. 279-287) (Oct. 2001).
Vinci et al. Quantum annealing correction with minor embedding. Physical Review A 92.4 (34 pgs) (Jul. 2015).
Wang et al. Population Annealing: Theory and Application in Spin Glasses. Physics Review E 92:961 (2015).
White. Density Matrix Formulation for Quantum Renormalization Groups. Physical Review Letters 69:286 (1992).
Wigner et al. Paulische equivalence ban. Magazine for physics 47:631 (1928) (English Abstract).
Wouters et al. A Practical Guide to Density Matrix Embedding Theory in Quantum Chemistry. J Chem Theory Comput. 12(6):2706-19 (2016).
Yang. Direct calculation of electron density in density-functional theory: Implementation for benzene and a tetrapeptide, Physical Review A 44:(11):7823-7826 (1991).
Zimmerman et al. Strong Correlation in Incremental Full Configuration Interaction. Journal of Chemical Physics 146:224104 (2017).
Cowtan et al. On the qubit routing problem. arXiv:1902.08091v2 (2019).
EP17812349.3 Third Party Observations dated Oct. 29, 2020.
Li. Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).
Lu et al., Quantum chemistry simulation on quantum computers: theories and experiments. Physical Chemistry Chemical Physics 14(26):9411-9420 (2012).
Moll et al., Optimizing qubit resources for quantum chemistry simulations in second quantization on quantum computer. Journal of Physics A: Mathematical and Theoretical 49(29):295301 (2016).
Niklasson et al., Fast method for quantum mechanical molecular dynamics. Physical Review B 86(17):174308 (2012).
Siraichi et al. Qubit Allocation. CGO 2018—International Symposium on Code Generation and Optimization, Feb. 2018, Vienna, Austria (12 pgs) (2018). pp.1-12.
Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016 .
U.S. Appl. No. 16/888,446 3rd Party Submission dated Apr. 7, 2021.
Whitfield et al., Simulation of electronic structure Hamiltonians using quantum computers. Molecular Physics 109(5):735-750 (2011).
Wooters et al. The no-cloning theorem. Physics Today 62(2):76-77 (2009).
Zulehner et al. Efficient mapping of quantum circuits to the IBM QX architectures. In Design, Automation & Test in Europe Conference & Exhibition 2018 38(7):1226-1236 (2018).
Aggarwal et al.: Evolutionary network analysis: a survey. ACM Computing Surveys 47(1):10:1-10:36 (2014).
Amelio et al.: Community mining in signed networks: a multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).
Anchuri et al.: Communities and balance in signed networks: a spectral approach. In Proceedings of the 2012 International Conference on Advances in Social Networks Analysis and Mining (ASONAM 2012), ASONAM 2012, pp. 235-242, Washington, DC, USA (2012).
Bhagat et al.: Node Classification in Social Networks. arXiv:1101.3291v1 Social Network Data Analytics, pp. 115-148 (2011).

(56) References Cited

OTHER PUBLICATIONS

Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv: 1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Chen et al.: Community Detection via Maximization of Modularity and Its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).
Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Conforti et al.: Integer Programming: Graduate Texts in Mathematics 271. Springer [1-466] (2014).
Debnath et al.: Demonstration of a small programmable quantum computer with atomic qubits. arXiv:1603.04512 Nature 536(7614):63-66 doi:10.1038/nature18648 (2016).
Elvira et al.: Efficient Multiple Importance Sampling Estimators. pre-print arxiv.org/pdf/1505.05391, pp. 1-7 (2015).
Esmailian et al.: Mesoscopic analysis of online social networks: The role of negative ties. arXiv:1411.6057v1 Phys. Rev. E90:042817, pp. 1-13 (2014).
Ferrara et al.: Detecting criminal organizations in mobile phone networks. arXiv:1404.1295v1 Expert Systems with Applications 41(13):5733-5750 (2014).
Fortunato: Community detection in graphs. arXiv.org, Cornell University, arXiv:0906.0612v1 [physics.soc-ph], pp. 1-89 (2009).
Gelman et al.: Simulating normalizing constants: from importance sampling to bridge sampling to path sampling. Statist. Sci. 13(2):163-185 DOI:10.1214/ss/1028905934 (1998).
Glover et al.: Tabu Search: Modern Heuristic Techniques for Combinatorial Problems. Colin R. Reeves (Ed.) Black Scientific Publications, Oxford [1-62] (1993).
Glover: Tabu search—part II. ORSA Journal on computing 2(1):4-32.1 4-32 DOI:10.1287/ijoc.2.1.4 (1990).
Hamilton et al.: Representation Learning on Graphs: Methods and Applications. arXiv.org, Cornell University, arXiv:1709.05584v3 [cs.SI], pp. 1-24 (2018).
He et al.: MISAGA: an Algorithm for Mining Interesting Subgraphs in Attributed Graphs. IEEE Transactions on Cybernetics 48(5):1369-1382 (2018).
Heider: Attitudes and cognitive organization. The Journal of Psychology 21(1):107-112 (1946).
Huang et al.: Predicting many properties of a quantum system from very few measurements. Nature Physics 16(10)1050-1057 doi:arxiv.org/abs/2002.08953 [1-40](2020).
Humble et al.: Software Systems for High-performance Quantum Computing. IEEE Xplore doi:10.1109/HPEC.2016.7761628 [1-8](2016).
Jones et al.: Implementation of a quantum algorithm to solve Deutsch's problem on a nuclear magnetic resonance quantum computer. arXiv:quant-ph/9801027v2 The Journal of chemical physics, 109(5):1648-1653 DOI:10.1063/1.476739 (1998).
Kassal et al.: Simulating chemistry using quantum computers. Annu Rev Phys Chem. 62:185- 207 (2011).
Kochenberger et al.: The unconstrained binary quadratic programming problem: a survey. J Comb Optim. 28(1)58-81 DOI:10.1007/s10878-014-9734-0 (2014).
Kunegis et al.: The slashdot zoo: Mining a social network with negative edges. In Proceedings of the 18th International 20 Conference on World Wide Web, WWW 2009, pp. 741-750, New York, NY, USA DOI:10.1145/1526709.1526809 (2009).
Lenstra: Integer programming with a fixed number of variables. 8(4):538-548 URL: https://doi.org/10.1287/moor.8.4.538 (1983).
Leskovec et al.: Empirical Comparison of Algorithms for Network Community Detection. Proceedings of International World Wide Web Conference 2010, Raleigh, North Carolina, USA, pp. 1-10 (2010).
Leskovec et al.: Predicting positive and negative links in online social networks. In Proceedings of the 19th International Conference on World Wide Web, WWW 2010, pp. 1-10, New York, NY, USA (2010).
Liben-Nowell et al.: The link prediction problem for social networks. In Proceedings of the Twelfth International Conference on Information and Knowledge Management, CIKM 2003, pp. 556-559, New York, NY, USA [1-19](2004).
Lin et al.: Understanding community effects on information diffusion. Advances in Knowledge Discovery and Data Mining, pp. 82-95 DOI:10.1007/978-3-319-18038-0_7 (2015).
Low et al.: Hamiltonian simulation by Qubitization. arXiv:1610.06546v3 Quantum 3:163 URL:https://doi.org/10.22331/q-2019-07-12-163 [1-23] (2019).
Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).
Lu et al.: KKT Solution and Conic Relaxation for Solving Quadratically Constrained Quadratic Programming Problem. Siam J. Optim. 21(4):1475-1490 DOI:10.1137/100793955 (2011).
Massa et al.: Controversial users demand local trust metrics: an experimental study on Epinions.com community. In Proceedings of the 20th National Conference on Artificial Intelligence AAA Press vol. 1, AAAI-05:121-126 (2005).
Medus et al.: Detection of community structures in networks via global optimization. Physica A: Statistical Mechanics and its Applications 358(2-4):593-604 DOI:10.1016/j.physa.2005.04.022 (2005).
Melko et al.: Restricted Boltzmann machines in quantum physics. Nature Physics 15(9):887-892 DOI:10.1038/s41567-019-0545-1 (2019).
Monz et al.: Realization of a scalable Shor algorithm. arXiv:1507.08852 Science 351(6277):1068-1070 DOI:10.1126/science.aad9480 (2015).
Motzkin et al.: Maxima for graphs as a new proof of a theorem of Turan. Canadian Journal of Mathematics 17:533-540 DOI:10.4153/CJM-1965-053-6 (1965).
Nagy et al.: Variational quantum Monte Carlo method with a neural-network ansatz for open quantum systems. Phys Rev Letters 122(25):250501 doi:arxiv.org/abs/1902.09483 [1-10](2019).
Nam et al.: Ground-state energy estimation of the water molecule on a trapped ion quantum computer. arXiv preprint arXiv:1902.10171, pp. 1-14 (2019).
Newman et al.: Finding and evaluating community structure in networks. Phys. Rev. E. 69:026113, pp. 1-16 (2004).
Newman: Modularity and community structure in networks. PNAS 103(23):8577-8582 (2006).
Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).

(56) References Cited

OTHER PUBLICATIONS

PCT/CA2021/050709 International Search Report and Written Opinion dated Aug. 3, 2021.
PCT/CA2021/050750 International Search Report and Written Opinion dated Aug. 6, 2021.
PCT/IB2019/055226 International Search Report and Written Opinion dated Nov. 26, 2019.
PCT/IB2020/055801 International Search Report and Written Opinion dated Oct. 30, 2020.
PCT/IB2020/061464 International Search Report and Written Opinion dated Mar. 4, 2021.
PCT/IB2021/051965 International Search Report and Written Opinion dated May 31, 2021.
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett. 103.220502 (2009).
Quek et al.: Adaptive Quantum State Tomography with Neural Networks. arXiv.org, Cornell University, arXiv:1812.06693v1 [quant-ph], pp. 1-13 pages (2018).
Reiher et al.: Elucidating reaction mechanisms on quantum computers. PNAS USA 114(29):7555-7560 (2017).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Salathe et al.: Dynamics and control of diseases in networks with community structure. PLOS Computational Biology 6(4):e1000736, pp. 1-11 (2010).
Schuld et al., "Quantum machine learning in feature Hilbert spaces", Phys. Rev. Lett.; Feb. 1, 2019, vol. 122, pp. 040504-1-12.
Schwabl: Quantum Mechanics. Springer, 4th Ed. [1-425] (2007).
Shen et al.: Quantum implementation of the unitary coupled cluster for simulating molecular electronic structure. Phys. Rev. A 95, 020501(R) doi:10.1103/PhysRevA.95.020501 [1-6] (2017).
Srinivas et al.: Muiltiobjective optimization using non-dominated sorting in genetic algorithms. Evolutionary Computation 2(3):221-248 (1994).
Tang et al.: A Survey of Signed Network Mining in Social Media. ACM Computing Surveys 9(4): pp. 39:1 to 39:38, arXiv.org, Cornell University, arXiv:1511.07569v3 [cs.SI] (2016).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).
Torlai et al.: Neural-network quantum state tomography. pre-print arXiv:1703.05334v2 Nature Physics 14:447-450 DOI:10.1038/s41567-018-0048-5 (2017).
U.S. Appl. No. 16/811,479 Non-Final Office Action dated Aug. 30, 2021.
Veis et al.: Quantum computing applied to calculations of molecular energies: CH2 benchmark. J Chem Phys. 133(19):194106 doi:10.1063/1.3503767 [1-29](2010).
Venuti et al.: Adiabaticity in open quantum systems. arXiv:1508.05558v2 Phys. Rev. A93(3):032118, pp. 1-12 DOI:10.1103/PhysRevA.93.032118 (2016).
Waskiewicz: Friend of a friend influence in terrorist social networks. In Proceedings on the International Conference on Artificial Intelligence (ICAO, pp. 1-5. The Steering Committee of The World Congress in Computer Science, Computer Engineering and Applied Computing (WorldComp) (2012).
Wendin: Quantum information processing with superconducting circuits: a review. Rep Prog Phys. 80(10):106001 doi:10.1088/1361-6633/aa7e1a [1-50](2017).
Xu et al.: Neural network state estimation for full quantum state tomography. ArXiv preprint doi:arxiv.org/abs/1811.06654 [1-8] (2018).

Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Aharonov, et al. Adiabatic quantum state generation and statistical zero knowledge. Proceedings of the thirty-fifth annual ACM symposium on Theory of computing. 2003. https://arxiv.org/abs/quant-ph/0301023.
An et al., "Quantum linear system solver based on time-optimal adiabatic quantum computing and quantum approximate optimization algorithm," 2019, arXiv preprint arXiv:1909.05500.
Boixo, et al., "Fast quantum algorithms for traversing paths of eigenstates," 2010, arXiv preprint arXiv:1005.3034, 36 pgs.
Boixo et al., "Quantum state preparation by phase randomization," 2009, arXiv preprint arXiv:0903.1652.
Bombin, et al. Topological quantum distillation. Phys Rev Lett. Nov. 3, 2006;97(18):180501. doi: 10.1103/PhysRevLett.97.180501. Epub Oct. 30, 2006.
Brassard, et al., "An exact quantum polynomial-time algorithm for Simon's problem," Proceedings of the Fifth Israeli Symposium on Theory of Computing and Systems, IEEE, 1997; 12 pgs.
Chamberland et al, Triangular color codes on trivalent graphs with flag qubits. New J. Phys. Feb. 2020. vol. 22 023019. 24 pages. https://doi.org/10.1088/1367-2630/ab68fd.
Co-pending U.S. Appl. No. 18/053,080, inventor Dadashikelayeh; Majid, filed Nov. 7, 2022.
Co-pending U.S. Appl. No. 18/189,390, inventors Dadashikelayeh; Majid et al., filed Mar. 24, 2023.
Co-pending U.S. Appl. No. 18/297,513, inventors Rosenberg; Gilad Amir et al., filed Apr. 7, 2023.
Co-pending U.S. Appl. No. 18/331,030, inventors Yildiz; Ugur et al., filed Jun. 7, 2023.
Das et al, A Scalable Decoder Micro-architecture for Fault-Tolerant Quantum Computing. arXiv preprint arXiv:2001.06598 (2020).
Delfosse et al, Almost-linear time decoding algorithm for topological codes. Quantum 5 (2021): 595.
Delfosse et al, Toward a Union-Find decoder for quantum LDPC codes. IEEE Transactions on Information Theory 68.5 (2022): 3187-3199.
Fan, et al. Robust Optimization of Graph Partitioning and Critical Node Detection in Analyzing Networks. In Combinatorial Optimization and Applications—4th International Conference, COCOA 2010, Proceedings (PART 1 ed., pp. 170-183). (Year: 2010).
Fan, et al. Robust optimization of graph partitioning involving interval uncertainty. Theoretical Computer Science. 447 (2012): 53-61.
Fowler, A.G. Minimum weight perfect matching in O (1) parallel time. arXiv 1307 (2013).
Gheorghiu, V. Standard form of qudit stabilizer groups. arXiv preprint arXiv:1101.1519 (2011).
Glover et al. Tabu Search. Handbook of Combinatorial Optimization, Du DZ., Pardalos P.M. (eds), Springer, Boston, MA, 1998; 94 pgs.
Gottesman, D. An Introduction to Quantum Error Correction and Fault-Tolerant Quantum Computation. arXiv preprint arXiv:0904.2557 (2009).
Han et al., "Approximate computing: an emerging paradigm for energy-efficient design," 18th IEEE European Test Symposium (ETS), IEEE, 2013; https://ieeexplore.ieee.org/document/6569370.
Hennessy, et al. Computer Architecture: a Quantitative Approach. Elsevier Science & Technology, 2014. ProQuest Ebook Central, https://ebookcentral.proquest.com/lib/uspto-ebooks/detail.action?docID=404052 . (Year: 2014).
Huang et al, Fault-tolerant weighted union-find decoding on the toric code. Physical Review A 102.1 (2020): 012419.
Jiang, et al. Simulated annealing based influence maximization in social networks. Twenty-fifth AAAI conference on artificial intelligence (AAAI'11). AAAI Press, 127-132. (Year: 2011).
Karimi, et al. Practical integer-to-binary mapping for quantum annealers. Quantum Information Processing, vol. 18, No. 4, 94 (2019) DOI: 10.1007/s11128-019-2213-x.

(56) References Cited

OTHER PUBLICATIONS

Knill, et al. Resilient Quantum Computation: Error Models and Thresholds. Proceedings of the Royal Society of London. Series A: Mathematical, Physical and Engineering Sciences 454.1969 (1998): 365-384.
Krol et al., "Efficient decomposition of unitary matrices in quantum circuit compilers," 2021, arXiv preprint arXiv:2101.02993, 13 pgs.
Kubica et al, Efficient color code decoders in d=2 dimensions from toric code decoders. arXiv preprint arXiv:1905.07393 (2019).
Matsubara, et al. Ising-Model Optimizer with Parallel-Trial Bit-Sieve Engine. Complex, Intelligent, and Software Intensive Systems: Proceedings of the 11th International Conference on Complex, Intelligent, and Software Intensive Systems (CISIS-2017), pp. 432-438, 2018.
McCaskey, et al. Hybrid Programming for Near-term Quantum Computing Systems. 2018 IEEE international conference on rebooting computing (ICRC). 2018. pp. 1-12.
Membrives, E.J. Machine-Learning for Optimization of Software Parameters. Technical Disclosure Commons. Defensive Publication Series. Dec. 7, 2017. pp. 1-35. https://www.tdcommons.org/dpubs_series/898.
Nielsen, et al. Quantum Computation and Quantum Information. Chapter 10: Quantum error-correction. Cambridge University Press. pp. 425-499. (2010).
Parekh, et al. Benchmarking adiabatic quantum optimization for complex network analysis. arXiv preprint arXiv: 1604.00319 (2016). (Year: 2016).
PCT/IB2021/059421 International Search Report and Written Opinion dated Dec. 20, 2021.
PCT/IB2021/061527 International Search Report and Written Opinion dated Apr. 8, 2022.
PCT/IB2022/053658 International Search Report and Written Opinion dated Jun. 27, 2022.
PCT/IB2022/056124 International Search Report and Written Opinion dated Sep. 16, 2022.
PCT/IB2022/059253 International Search Report and Written Opinion dated Jan. 27, 2023.
Pedram, et al. Layout Optimization for Quantum Circuits with Linear Nearest Neighbor Architectures. IEEE Circuits and Systems Magazine 16 (2016): 62-74.
Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.
Rappe, et al. UFF, a Full Periodic Table Force Field for Molecular Mechanics and Molecular Dynamics Simulations. J. Am. Chem. Soc. 1992, 114, 25, 10024-10035. https://doi.org/10.1021/ja00051a040.
Resende, et al. GRASP with path-relinking: Recent advances and applications. Metaheuristics: progress as real problem solvers (2005): 29-63.
Sefi, et al. How to decompose arbitrary continuous-variable quantum operations. Physical review letters 107.17 (2011): 170501.
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
U.S. Appl. No. 15/900,643 Office Action dated Apr. 14, 2022.
U.S. Appl. No. 16/671,767 Office Action dated Aug. 30, 2022.
U.S. Appl. No. 16/811,479 Office Action dated Apr. 8, 2022.
U.S. Appl. No. 16/811,479 Office Action dated Feb. 14, 2023.
U.S. Appl. No. 16/811,479 Office Action dated Sep. 22, 2022.
U.S. Appl. No. 17/110,729 Office Action dated May 9, 2023.
U.S. Appl. No. 17/254,661 Office Action dated Mar. 18, 2022.
U.S. Appl. No. 17/254,661 Office Action dated Mar. 22, 2023.
U.S. Appl. No. 17/254,661 Office Action dated Sep. 14, 2022.
U.S. Appl. No. 17/553,551 Office Action dated Jul. 17, 2023.
U.S. Appl. No. 18/047,882 Office Action dated Jul. 3, 2023.
U.S. Appl. No. 18/047,981 Office Action dated Jan. 11, 2023.
Ushijima-Mwesigwa, et al. Graph Partitioning using Quantum Annealing on the D-Wave System. Proceedings of the Second International Workshop on Post Moores Era Supercomputing. 2017. (Year: 2017).
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.
Yanagimoto, et al. Engineering a Kerr-based Deterministic Cubic Phase Gate via Gaussian Operations. Physical Review Letters 124.24 (2020): 240503.
Zhu, et al. Training of quantum circuits on a hybrid quantum computer. Sci Adv. Oct. 2019; 5(10): eaaw9918. Published online Oct. 18, 2019. doi: 10.1126/sciadv.aaw9918.
Booth, K.E.C. et al., Comparing and Integrating Constraint Programming and Temporal Planning for Quantum Circuit Compilation, Twenty-Eighth International Conference on Automated Planning and Scheduling (ICAPS 2018), pp. 366-374 (2018).
Butenko, S., Maximum Independent Set and Related Problems, With Applications, a Dissertation Presented to the Graduate School of the University of Florida in Partial Fulfillment of the Requirements for the Degree of Doctor of Philosophy University of Florida, 167 pages (2003).
Eidenbenz et al. Quantum Algorithm Implementations for Beginners. https://arxiv.org/abs/1804.03719, arXiv:1804.03719v1 [cs.ET ], Apr. 10, 2018, pp. 1-75) (Year: 2018).
Gibbons, L.E. et al., Continuous Characterizations of the Maximum Clique Problem, DIMACS Technical Report 96-09, Center for Applied Optimization Dept of Industrial and Systems Engineering University of Florida, Gainesville, FL 32611, 19 pages (Apr. 1996).
Gibbons, L.E. et al., Continuous Characterizations of the Maximum Clique Problem, Mathematics of Operational Research 22(3):754-768 (Aug. 1997).
Herbert, S. et al., Using Reinforcement Learning to find Efficient Qubit Routing Policies for Deployment in Near-term Quantum Computers, arXiv:1812.11619, pp. 1-13 (Dec. 30, 2018).
Imamoglu, et al. Quantum information processing using quantum dot spins and cavity-QED. arXiv preprint quant-ph/9904096 (1999).
Inagaki, T., Combinatorial optimization using optical oscillator networks, J-Stage 33(5):586-591 (2018).
Kako, S. et al., Coherent Ising Machines with Error Correction Feedback, Advanced Quantum Technologies 3(2000045):14 pages (2020).
Lamb, I.D.C. et al., An FPGA-based Instrumentation Platform for use at Deep Cryogenic Temperatures, arXiv:1509.06809 [physics.ins-det]: 1-8 (2015).
Lavnikevich, N., (1, k)-Swap Local Search for Maximum Clique Problem, arXiv:1704.00908 [math.OC], 14 pages, submitted on Apr. 4, 2017, abstract, 3 pages.
Pardalos, P.M. et al., The Maximum Clique Problem, Journal of Global Optimization 4:301-328 (1994).
PCT/IB2023/056105 International Search Report and Written Opinion dated Oct. 16, 2023.
PCT/IB2023/060066 International Search Report and Written Opinion dated Dec. 20, 2023.
Pilch, J. et al., An FPGA-based real quantum computer emulator, Journal of Computational Electronics 18:329-342 (2019).
Sarma, Abhijat, et al. Quantum Unsupervised and Supervised Learning on Superconducting Processors. ArXiv, 2019, /abs/1909.04226 (2019).
Sinha, A. et al., Qubit Routing using Graph Neural Network aided Monte Carlo Tree Search, arXiv:2104:01992v1, pp. 1-10 (Apr. 1, 2021).
U.S. Appl. No. 17/110,729 Office Action dated Sep. 29, 2023.
U.S. Appl. No. 17/254,661 Office Action dated Sep. 18, 2023.
U.S. Appl. No. 17/553,551 Notice of Allowance dated Dec. 1, 2023.
U.S. Appl. No. 18/047,882 Notice of Allowance dated Jan. 18, 2024.
U.S. Appl. No. 18/047,981 Corrected Notice of Allowance dated Aug. 18, 2023.
Bennewitz, Elizabeth R. et al. Neural Error Mitigation of Near-Term Quantum Simulations. arXiv (with supplemental information): pp. 1-20 (2023).

(56) References Cited

OTHER PUBLICATIONS

Bougrain, Laurent. Practical Introductions to Artificial Neural Networks. IFAC Publications 37(15):347-352 (2003).
Haner, Thomas et al. High Performance Emulation of Quantum Circuits. SC'16: Proceedings of the International Conference for High Performance Computing, Networking, Storage and Analysis. IEEE:866-874 (2016).
Jia, Zhih-Ahn et al. Quantum Neural Network States. arXiv : pp. 1-18 (2018).
PCT/IB2023/054723 International Search Report and Written Opinion dated Jul. 19, 2023.
U.S. Appl. No. 17/110,729 Notice of Allowance dated Jun. 21, 2024.
U.S. Appl. No. 17/110,729 Notice of Allowance dated Mar. 14, 2024.
U.S. Appl. No. 17/317,644 Office Action dated Oct. 23, 2024.
Yang, Li. et al. Deep learning-enhanced variational Monte Carlo method for quantum many-body physics. Physical Review Research 2(1): 012039, 1-6 (2020).
Zhou, Leo, et al., Quantum Approximate Optimization Algorithm: Performance, Mechanism, and Implementation on Near-Term Devices. arXiv 1-19 (2018).

\* cited by examiner

SYSTEMS AND METHODS FOR STOCHASTIC OPTIMIZATION OF A ROBUST INFERENCE PROBLEM

CROSS-REFERENCE

This application is a continuation of International Patent Application PCT/CA2018/051534, filed Nov. 30, 2018, which claims priority to U.S. Provisional Patent Application No. 62/593,563, filed Dec. 1, 2017, and U.S. Provisional Patent Application No. 62/716,041, filed Aug. 8, 2018, each of which is entirely incorporated herein by reference for all purposes.

BACKGROUND

In various engineering fields, a robust inference problem often times can be too complex for solving it numerically directly even though the direct mathematical modeling may exist. Stochastic optimization is an approach for minimizing or maximizing a function that uses randomness to partially evaluate constituent functions and may thus be applicable to optimize very complex models.

SUMMARY

Methods and systems of the present disclosure advantageously enable smoothing of various objective functions in robust inference problems, thereby making such functions amenable to computation via stochastic-gradient methods using sampling in place of solving the inference problem exactly. Such methods and systems advantageously connect the gradient of the smoothed function approximation to a Boltzmann distribution, which can be sampled by a sampling device using a simulated process and/or quantum process, in particular quantum-annealing process, thermal or adiabatic relaxation of a classical computer, semi-classical computer, or a quantum processor/device, and/or other physical process.

The present disclosure provides systems for stochastic optimization of a robust inference problem, which may be used to learn or estimate the parameter(s) of a model expressed via a mathematical or a statistical function with a maximum margin principle and/or maximum likelihood principle, where the learned model parameter(s) determine an instance of the mathematical or statistical function. In particular, model parameter(s) may determine the weight(s) of a probabilistic graphical model for prediction in the case of the statistical function being the energy function of the graphical model, for example a transverse field Ising model or other classical or quantum model of a many-body system. This approach may provide a general framework for many machine learning algorithms and tasks. Non-limiting examples of machine learning algorithms include structured support vector machines (SSVMs).

Systems and methods of the present disclosure may advantageously improve the technical field of data science so that complex inference problems can be solved in various applications in data science, such as clustering of documents, group detection in a crowd, recommender systems, semi-supervised learning, and active learning. The systems and methods disclosed herein can also have various applications in natural language processing, such as noun phrase coreference resolution, and computer vision and image processing applications, such as image segmentation.

In an aspect, the present disclosure provides a computer-implemented method for stochastic optimization of a robust inference problem using a sampling device, comprising receiving, by a digital computer, data of the robust inference problem, wherein the data comprises: a set of loss functions grouped into non-overlapping subsets, wherein each loss function in the set of loss functions accepts a first and second arguments, wherein the first and second arguments are independent, and wherein the first argument employs a continuous vector as its value, and the second argument employs a discrete vector as its value; a set of permissible discrete vectors for each loss function in the set of the loss functions; and an initial continuous vector for the first argument of each loss function in the set of loss functions; setting, by the digital computer, a current value of the continuous vector as the initial continuous vector; receiving, by the digital computer, a schedule of a set of scaling parameters; setting, by the digital computer, initial values of the set of scaling parameters based at least in part on the schedule; and until a stopping criterion is met, the stopping criterion comprising a set of rules for determining accuracy of a solution to the robust inference problem: determining current values of the set of scaling parameters, wherein the current values are based at least in part on the schedule of the set of scaling parameters; selecting a subset of the loss functions from the non-overlapping subsets, wherein the selection is non-repetitive or repetitive; iterating the following steps for each loss function of the selected subset of the loss functions: generating, by the sampling device, one or more samples of discrete vectors, each sample of the one or more samples being generated from the set of permissible discrete vectors associated with the loss function, wherein each sample of the one or more samples is generated based on a probability distribution determined at least in part by the set of scaling parameters and the loss function, wherein the first argument of the loss function takes the current value of the continuous vector; obtaining, by the digital computer, one or more gradients, wherein each of the one or more gradients is of the loss function taken with respect to the first argument; wherein the first argument of the loss function takes the current value of the continuous vector, and the second argument takes value of a selected sample from the one or more samples, wherein the selected sample is non-repetitively selected; and obtaining, by the digital computer, an average of the one or more gradients; obtaining, by the digital computer, a summation and/or a partial summation of the averages of the one or more gradients, wherein the summation is for all loss functions in the selected subset of the loss functions, and wherein the partial summation is for more than one loss functions in the selected subset of the loss functions; computing, by the digital computer, a search direction based at least in part on: v1) the summation or the partial summation of the averages of the one or more gradients, v2) the current values of the set of scaling parameters, v3) at least part of a history of the summation or partial summation of the averages of the one or more gradients, and/or v4) at least part of a history of the values of the set of scaling parameters; computing, by the digital computer, a step length based at least in part on: vi 1) the current values of the set of scaling parameters, vi2) the set of loss functions, vi3) at least part of a history of values of the set of scaling parameters, and/or vi4) at least part of a history of the set of loss functions; computing, by the digital computer, an updated current continuous vector using the step length and the search direction; and setting, by the digital computer, the current value of the continuous vector to be the updated current continuous vector.

The present disclosure advantageously utilizes a sampling device for solving the complex robust inference problem.

The sampling device can comprise a quantum processor and a quantum device control system for obtaining the schedule of the set of scaling parameters and the data of the robust inference problem. The quantum processor may be coupled to the digital computer and to the quantum device control system. The quantum processor may comprise a plurality of qubits and a plurality of couplers, each coupler of the plurality of couplers for providing a communicative coupling at a crossing of two qubits of the plurality of qubits. The one or more samples of discrete vectors may follow a Boltzmann distribution.

The sampling device can be a network of optical parametric oscillators, the network can comprise: an optical device, the optical device configured to receive energy from an optical energy source and generate a plurality of optical parametric oscillators; and a plurality of coupling devices, each of which controllably couples an optical parametric oscillator of the plurality of optical parametric oscillators. The sampling device may comprise a central processing unit, e.g., a digital computer or a mobile device, and a memory unit coupled to the central processing unit. The memory unit may comprise an application for obtaining the schedule of the scaling parameter and the data of the robust inference problem. Such application can be web application or mobile application.

The sampling device can comprise a reconfigurable digital hardware, a central processing unit and a memory unit, the central processing unit and the memory unit coupled to the reconfigurable digital hardware. The reconfigurable digital hardware may be adapted for obtaining the schedule of the scaling parameter and the data of the robust inference problem, and wherein the reconfigurable digital hardware is adapted to perform a Markov Chain Monte Carlo algorithm. The Markov Chain Monte Carlo algorithm may be Simulated Quantum Annealing. The Markov Chain Monte Carlo algorithm may be Simulated Annealing. The Markov Chain Monte Carlo algorithm may be Gibbs Sampling.

The set of loss functions may comprise one or more loss functions.

The stochastic optimization of the robust inference problem may be associated with training a structured support vector machine. Each subset of the non-overlapping subsets of loss functions may comprise only two loss functions. The stochastic optimization of the robust inference problem may be associated with image segmentation.

The stochastic optimization of the robust inference problem may be associated with a dual of the basis pursuit problem from compressed sensing.

The stochastic optimization of the robust inference problem may be associated with semi-supervised learning. The data of the robust inference problem can be associated with one or more image segmentation problems. The data of the robust inference problem can be associated with a dual of the basis pursuit problem from one or more compressed sensing problems. The data of the robust inference problem may be associated with semi-supervised learning. The data of the robust inference problem can be obtained from a noun phrase co-reference resolution problem. The data of the robust inference problem may be associated with active learning. The data of the robust inference problem may be associated with one or more image tagging problems. The data of the robust inference problem may be associated with a recommender system.

The schedule of the set of scaling parameters can be determined manually by a user or automatically by an algorithm or a computer program. The schedule of the set of scaling parameters can be determined using a machine learning algorithm based on history of the set of scaling parameters.

The digital computer can be remotely located with respect to the sampling device.

The stopping criterion may be based at least in part on a magnitude of a distance between the current and the updated current continuous vectors.

The loss functions can comprise of composite functions of the first and second set of arguments.

In the operation of obtaining one or more gradients, each of the one or more gradients may be of the loss function taken with respect to the first argument comprises of iterative applications of chain rule. The iterative application of chain rule may be performed using auto-differentiation.

In some cases, in the argument functions of the composite functions are differentiable feature extractors. In some cases, in the differentiable feature extractors are deep neural networks.

Computing a search direction may utilize one or more of: stochastic gradient descent (SGD), stochastic average gradient methods (SAG and SAGA), stochastic variance-reduced gradient (SVRG), and stochastic dual coordinate ascent (SDCA).

Computing a step length uses one of the adaptive gradient descent methods may include but may not be limited to Adam, reduced mean square (RMS), RMSProp, and AdaGrad.

In an aspect, the present disclosure provides a system for stochastic optimization of a robust inference problem using a sampling device, comprising a digital computer configured to: receive data of the robust inference problem, wherein the data comprises: a set of loss functions grouped into non-overlapping subsets, wherein each loss function in the set of loss functions accepts a first and second arguments, wherein the first and second arguments are independent, and wherein the first argument employs a continuous vector as its value, and the second argument employs a discrete vector as its value; a set of permissible discrete vectors for each loss function in the set of the loss functions; and an initial continuous vector for the first argument of each loss function in the set of loss functions; set a current value of the continuous vector as the initial continuous vector; receive a schedule of a set of scaling parameters; set initial values of the set of scaling parameters based at least in part on the schedule; and until a stopping criterion is met, the stopping criterion comprising a set of rules for determining accuracy of a solution to the robust inference problem: determine current values of the set of scaling parameters, wherein the current values are based at least in part on the schedule of the set of scaling parameters; select a subset of the loss functions from the non-overlapping subsets, wherein the selection is non-repetitive or repetitive; iterate the following steps for each loss function of the selected subset of the loss functions: generating, by the sampling device, one or more samples of discrete vectors, each sample of the one or more samples being generated from the set of permissible discrete vectors associated with the loss function, wherein each sample of the one or more samples is generated based on a probability distribution determined at least in part by the set of scaling parameters and the loss function, wherein the first argument of the loss function takes the current value of the continuous vector; obtaining one or more gradients, wherein each of the one or more gradients is of the loss function taken with respect to the first argument; wherein the first argument of the loss function takes the current value of the continuous vector, and the second argument takes value of a selected sample from the one or more samples, wherein the selected sample is non-repetitively selected; and obtaining an average of the one or more gradients; obtain a summation and/or a partial summation of the averages of the one or more gradients, wherein the summation is for all loss functions in the selected subset of the loss functions, and wherein the partial summation is for more than one loss functions in the selected subset of the loss functions; compute a search direction based at least in part on: v1) the summation or the partial summation of the averages of the one or more gradients, v2) the current values of the set of scaling parameters, v3) at least part of a history of the summation or partial summation of the averages of the one or more gradients, and/or v4) at least part of a history of the values of the set of scaling parameters; compute a step length based at least in part on: vi1) the current values of the set of scaling parameters, vi2) the set of loss functions, vi3) at least part of a history of values of the set of scaling parameters, and/or vi4) at least part of a history of the set of loss functions; compute an updated current continuous vector using the step length and the search direction; and set the current value of the continuous vector to be the updated current continuous vector.

The present disclosure advantageously utilizes a sampling device for solving the complex robust inference problem. The sampling device can comprise a quantum processor and a quantum device control system for obtaining the schedule of the set of scaling parameters and the data of the robust inference problem. The quantum processor may be coupled to the digital computer and to the quantum device control system. The quantum processor may comprise a plurality of qubits and a plurality of couplers, each coupler of the plurality of couplers for providing a communicative coupling at a crossing of two qubits of the plurality of qubits. The one or more samples of discrete vectors may follow a Boltzmann distribution.

The sampling device can be a network of optical parametric oscillators, the network can comprise: an optical device, the optical device configured to receive energy from an optical energy source and generate a plurality of optical parametric oscillators; and a plurality of coupling devices, each of which controllably couples an optical parametric oscillator of the plurality of optical parametric oscillators. The sampling device may comprise a central processing unit, e.g., a digital computer or a mobile device, and a memory unit coupled to the central processing unit. The memory unit may comprise an application for obtaining the schedule of the scaling parameter and the data of the robust inference problem. Such application can be web application or mobile application.

The sampling device can comprise a reconfigurable digital hardware, a central processing unit and a memory unit, the central processing unit and the memory unit coupled to the reconfigurable digital hardware. The reconfigurable digital hardware may be adapted for obtaining the schedule of the scaling parameter and the data of the robust inference problem, and wherein the reconfigurable digital hardware is adapted to perform a Markov Chain Monte Carlo algorithm. The Markov Chain Monte Carlo algorithm may be Simulated Quantum Annealing. The Markov Chain Monte Carlo algorithm may be Simulated Annealing. The Markov Chain Monte Carlo algorithm may be Gibbs Sampling.

The set of loss functions may comprise one or more loss functions.

The stochastic optimization of the robust inference problem may be associated with training a structured support vector machine. Each subset of the non-overlapping subsets of loss functions may comprise only two loss functions. The stochastic optimization of the robust inference problem may be associated with image segmentation.

The stochastic optimization of the robust inference problem may be associated with a dual of the basis pursuit problem from compressed sensing.

The stochastic optimization of the robust inference problem may be associated with semi-supervised learning. The data of the robust inference problem can be associated with one or more image segmentation problems. The data of the robust inference problem can be associated with a dual of the basis pursuit problem from one or more compressed sensing problems. The data of the robust inference problem may be associated with semi-supervised learning. The data of the robust inference problem can be obtained from a noun phrase co-reference resolution problem. The data of the robust inference problem may be associated with active learning. The data of the robust inference problem may be associated with one or more image tagging problems. The data of the robust inference problem may be associated with a recommender system.

The schedule of the set of scaling parameters can be determined manually by a user or automatically by an algorithm or a computer program. The schedule of the set of scaling parameters can be determined using a machine learning algorithm based on history of the set of scaling parameters.

The digital computer can be remotely located with respect to the sampling device.

The stopping criterion may be based at least in part on a magnitude of a distance between the current and the updated current continuous vectors.

The loss functions can comprise of composite functions of the first and second set of arguments.

In the operation of obtaining one or more gradients, each of the one or more gradients may be of the loss function taken with respect to the first argument comprises of iterative applications of chain rule. The iterative application of chain rule may be performed using auto-differentiation.

In some cases, in the argument functions of the composite functions are differentiable feature extractors. In some cases, in the differentiable feature extractors are deep neural networks.

Computing a search direction may utilize one or more of: stochastic gradient descent (SGD), stochastic average gradient methods (SAG and SAGA), stochastic variance-reduced gradient (SVRG), and stochastic dual coordinate ascent (SDCA).

Computing a step length uses one of the adaptive gradient descent methods may include but may not be limited to Adam, reduced mean square (RMS), RMSProp, and AdaGrad.

In another aspect, a computer-implemented method for stochastic optimization of a robust inference problem using a sampling device may comprise: (a) receiving, by a digital computer, data of said robust inference problem, wherein said data comprises: (i) a set of objective functions or loss functions grouped into non-overlapping subsets, wherein each objective function or loss function in said set of loss functions accepts first and second arguments; and (ii) a set of permissible vectors for each objective function or loss function in said set of said objective functions or loss functions; (b) setting, by said digital computer, a current value of a vector; (c) receiving, by said digital computer, a schedule of a set of scaling parameters; and (d) until a stopping criterion is met: (i) determining current values of said set of scaling parameters based at least in part on said schedule; (ii) selecting a subset of said objective functions or loss functions from said non-overlapping subsets; (iii) iterating the following steps for each objective function or loss function of said selected subset of said objective functions or loss functions: (1) generating, by said sampling device, one or more samples of vectors from said set of permissible vectors associated with said objective function or loss function; (2) obtaining, by said digital computer, one or more gradients, wherein each of said one or more gradients is of said objective function or loss function taken with respect to said first argument; and (3) obtaining, by said digital computer, an average of said one or more gradients; (iv) obtaining, by said digital computer, a summation or a partial summation of said averages of said one or more gradients, wherein said summation is for all objective functions or loss functions in said selected subset of said objective functions or loss functions, and wherein said partial summation is for more than one objective function or loss function in said selected subset of said loss functions; (v) computing, by said digital computer, a search direction based at least in part on one or more of: v1) said summation or said partial summation of said averages of said one or more gradients; v2) said current values of said set of scaling parameters; v3) at least part of a history of said summation or partial summation of said averages of said one or more gradients; and v4) at least part of a history of said values of said set of scaling parameters; (vi) computing, by said digital computer, a step length based at least in part on one or more of: vi1) said current values of said set of scaling parameters; vi2) said selected subset of said loss functions; vi3) at least part of a history of values of said set of scaling parameters; and vi4) at least part of a history of said selected subset of said objective functions or loss functions; and (vii) setting, by said digital computer, said current value of said vector based on said step length and said search direction. Said objective functions or loss functions may comprise one or more composite functions of said first and second arguments. Obtaining, by said digital computer, one or more gradients, wherein each of said one or more gradients is of said objective function or loss function taken with respect to said first argument may comprise iterative applications of a chain rule. Said chain rule may be performed using auto-differentiation. One or more argument functions of said composite functions may comprise differentiable feature extractors. Said differentiable feature extractors may comprise deep neural networks. Computing, by said digital computer, a search direction may comprise using one or more of stochastic gradient descent (SGD), stochastic average gradient methods (SAG and SAGA), stochastic variance-reduced gradient (SVRG), or stochastic dual coordinate ascent (SDCA). Computing, by said digital computer, a step length may comprise using one or more of said adaptive gradient descent methods, and wherein said adaptive gradient descent methods comprises Adaptive Moment Estimation (Adam), reduced mean square (RMS), Root Mean Square Propagation (RMSProp), and/or adaptive gradient algorithm. (AdaGrad). Said sampling device may comprise a quantum processor and a quantum device control system for obtaining said schedule of said set of scaling parameters and said data of said robust inference problem. Said quantum processor may be coupled to said digital computer and to said quantum device control system. Said quantum processor may comprise a plurality of qubits and a plurality of couplers, each coupler of said plurality of couplers for providing a communicative coupling at a crossing of two qubits of said plurality of qubits. Said one or more samples of discrete vectors may follow a Boltzmann distribution. Said sampling device may comprise a network of optical parametric oscillators, said network comprising: (a) an optical device, said optical device configured to receive energy from an optical energy source and generate a plurality of optical parametric oscillators; and (b) a plurality of coupling devices, each of which controllably couples an optical parametric oscillator of said plurality of optical parametric oscillators. Said sampling device may comprise a central processing unit and a memory unit coupled to said central processing unit. Said memory unit may comprise an application for obtaining said schedule of said scaling parameter and said data of said robust inference problem, wherein said application is configured to implement a Markov Chain Monte Carlo algorithm. Said sampling device may comprise a reconfigurable digital hardware, a central processing unit and a memory unit, said central processing unit and said memory unit coupled to said reconfigurable digital hardware. Said reconfigurable digital hardware may be configured to obtain said schedule of said scaling parameter and said data of said robust inference problem, and said reconfigurable digital hardware may be configured to implement a Markov Chain Monte Carlo algorithm. Said Markov Chain Monte Carlo algorithm may comprise simulated quantum annealing. Said Markov Chain Monte Carlo algorithm may comprise simulated annealing. Said Markov Chain Monte Carlo algorithm may comprise Gibbs sampling. Said set of objective functions or loss functions may comprise one or more objective functions or loss functions. Said stochastic optimization of said robust inference problem may be associated with training a structured support vector machine. Each subset of said non-overlapping subsets of objective functions or loss functions may comprise only two objective functions or loss functions. Said data of said robust inference problem may be associated with an image segmentation problem. Said data of said robust inference problem may be associated with a dual of said basis pursuit problem from a compressed sensing problem. Said data of said robust inference problem may be associated with semi-supervised learning. Said data of said robust inference problem may be obtained from a noun phrase co-reference resolution problem. Said data of said robust inference problem may be associated with active learning. Said data of said robust inference problem may be associated with an image tagging problem. Said data of said robust inference problem may be associated with a recommender system. Said schedule of said set of scaling parameters may be determined by a user or automatically by an algorithm, Said digital computer may be remotely located with respect to said sampling device. Said stopping criterion may be based at least in part on a magnitude of a distance between said current and said updated current vectors. Said first and second arguments may be independent, and said first argument may employ a continuous vector as its value, said second argument may employ a discrete vector as its value, and said set of permissible vectors may comprise a set of permissible discrete vectors. (1) may comprise generating, by said sampling device, one or more samples of discrete vectors, each sample of said one or more samples being generated from said set of permissible discrete vectors associated with said objective function or loss function, wherein each sample of said one or more samples is generated based on a probability distribution determined at least in part by said set of scaling parameters and said objective function or loss function, wherein said first argument of said objective function or loss function takes said current value of said continuous vector. (2) may comprise obtaining, by said digital computer, one or more gradients, wherein each of said one or more gradients is of said loss function taken with respect to said first argument, wherein said first argument of said loss function takes said current value of said continuous vector, and said second argument takes value of a selected sample from said one or more samples, wherein said selected sample is non-repetitively selected. Said stopping criterion may comprise a set of rules for determining accuracy of a solution to said robust inference problem. Said selection of said subset of objective functions or loss functions may be non-repetitive or repetitive.

In another aspect, a system for stochastic optimization of a robust inference problem using a sampling device may comprise a digital computer configured to: (a) receive data of said robust inference problem, wherein said data comprises: (i) a set of objective functions or loss functions grouped into non-overlapping subsets, wherein each objective function or loss function in said set of loss functions accepts first and second arguments; and (ii) a set of permissible vectors for each objective function or loss function in said set of said objective functions or loss functions; (b) set a current value of a vector; (c) receive a schedule of a set of scaling parameters; and (d) until a stopping criterion is met: (i) determine current values of said set of scaling parameters based at least in part on said schedule; (ii) select a subset of said objective functions or loss functions from said non-overlapping subsets; (iii) iterate the following steps for each objective function or loss function of said selected subset of said objective functions or loss functions: (1) generating, by said sampling device, one or more samples of vectors from said set of permissible vectors associated with said objective function or loss function; (2) obtaining, by said digital computer, one or more gradients, wherein each of said one or more gradients is of said objective function or loss function taken with respect to said first argument; and (3) obtaining an average of said one or more gradients; (iv) obtain a summation or a partial summation of said averages of said one or more gradients, wherein said summation is for all objective functions or loss functions in said selected subset of said objective functions or loss functions, and wherein said partial summation is for more than one objective function or loss function in said selected subset of said loss functions; (v) compute a search direction based at least in part on one or more of: v1) said summation or said partial summation of said averages of said one or more gradients; v2) said current values of said set of scaling parameters; v3) at least part of a history of said summation or partial summation of said averages of said one or more gradients; and v4) at least part of a history of said values of said set of scaling parameters; (vi) compute a step length based at least in part on one or more of: vi1) said current values of said set of scaling parameters; vi2) said selected subset of said loss functions; vi3) at least part of a history of values of said set of scaling parameters; and vi4) at least part of a history of said selected subset of said objective functions or loss functions; and (vii) set said current value of said vector based on said step length and said search direction. Said objective functions or loss functions may comprise one or more composite functions of said first and second arguments. Obtaining, by said digital computer, one or more gradients, wherein each of said one or more gradients is of said objective function or loss function taken with respect to said first argument may comprise iterative applications of a chain rule. Said chain rule may be performed using auto-differentiation. One or more argument functions of said composite functions may comprise differentiable feature extractors. Said differentiable feature extractors may comprise deep neural networks. Computing, by said digital computer, a search direction may comprise using one or more of stochastic gradient descent (SGD), stochastic average gradient methods (SAG and SAGA), stochastic variance-reduced gradient (SVRG), or stochastic dual coordinate ascent (SDCA). Computing, by said digital computer, a step length may comprise using one or more of said adaptive gradient descent methods, and wherein said adaptive gradient descent methods comprises Adaptive Moment Estimation (Adam), reduced mean square (RMS), Root Mean Square Propagation (RMSProp), and/or adaptive gradient algorithm. (AdaGrad). Said sampling device may comprise a quantum processor and a quantum device control system for obtaining said schedule of said set of scaling parameters and said data of said robust inference problem. Said quantum processor may be coupled to said digital computer and to said quantum device control system. Said quantum processor may comprise a plurality of qubits and a plurality of couplers, each coupler of said plurality of couplers for providing a communicative coupling at a crossing of two qubits of said plurality of qubits. Said one or more samples of discrete vectors may follow a Boltzmann distribution. Said sampling device may comprise a network of optical parametric oscillators, said network comprising: (a) an optical device, said optical device configured to receive energy from an optical energy source and generate a plurality of optical parametric oscillators; and (b) a plurality of coupling devices, each of which controllably couples an optical parametric oscillator of said plurality of optical parametric oscillators. Said sampling device may comprise a central processing unit and a memory unit coupled to said central processing unit. Said memory unit may comprise an application for obtaining said schedule of said scaling parameter and said data of said robust inference problem, wherein said application is configured to implement a Markov Chain Monte Carlo algorithm. Said sampling device may comprise a reconfigurable digital hardware, a central processing unit and a memory unit, said central processing unit and said memory unit coupled to said reconfigurable digital hardware. Said reconfigurable digital hardware may be configured to obtain said schedule of said scaling parameter and said data of said robust inference problem, and said reconfigurable digital hardware may be configured to implement a Markov Chain Monte Carlo algorithm. Said Markov Chain Monte Carlo algorithm may comprise simulated quantum annealing. Said Markov Chain Monte Carlo algorithm may comprise simulated annealing. Said Markov Chain Monte Carlo algorithm may comprise Gibbs sampling. Said set of objective functions or loss functions may comprise one or more objective functions or loss functions. Said stochastic optimization of said robust inference problem may be associated with training a structured support vector machine. Each subset of said non-overlapping subsets of objective functions or loss functions may comprise only two objective functions or loss functions. Said data of said robust inference problem may be associated with an image segmentation problem. Said data of said robust inference problem may be associated with a dual of said basis pursuit problem from a compressed sensing problem. Said data of said robust inference problem may be associated with semi-supervised learning. Said data of said robust inference problem may be obtained from a noun phrase co-reference resolution problem. Said data of said robust inference problem may be associated with active learning. Said data of said robust inference problem may be associated with an image tagging problem. Said data of said robust inference problem may be associated with a recommender system. Said schedule of said set of scaling parameters may be determined by a user or automatically by an algorithm, Said digital computer may be remotely located with respect to said sampling device. Said stopping criterion may be based at least in part on a magnitude of a distance between said current and said updated current vectors. Said first and second arguments may be independent, and said first argument may employ a continuous vector as its value, said second argument may employ a discrete vector as its value, and said set of permissible vectors may comprise a set of permissible discrete vectors. (1) may comprise generating, by said sampling device, one or more samples of discrete vectors, each sample of said one or more samples being generated from said set of permissible discrete vectors associated with said objective function or loss function, wherein each sample of said one or more samples is generated based on a probability distribution determined at least in part by said set of scaling parameters and said objective function or loss function, wherein said first argument of said objective function or loss function takes said current value of said continuous vector. (2) may comprise obtaining, by said digital computer, one or more gradients, wherein each of said one or more gradients is of said loss function taken with respect to said first argument, wherein said first argument of said loss function takes said current value of said continuous vector, and said second argument takes value of a selected sample from said one or more samples, wherein said selected sample is non-repetitively selected. Said stopping criterion may comprise a set of rules for determining accuracy of a solution to said robust inference problem. Said selection of said subset of objective functions or loss functions may be non-repetitive or repetitive.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and a non-transitory computer readable medium (e.g., computer memory) coupled thereto. The non-transitory computer readable medium comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
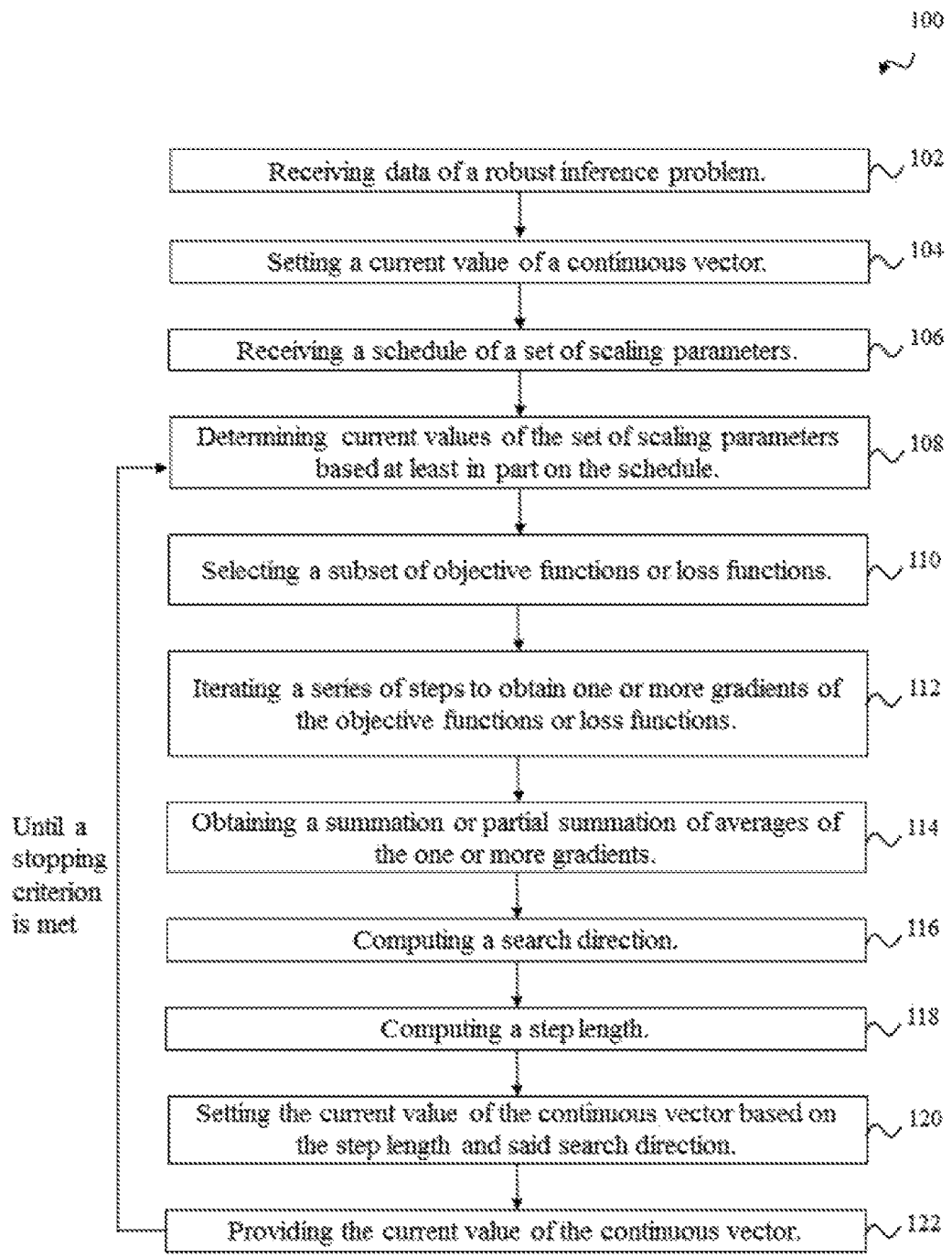
FIG. 1 shows a flowchart for a non-limiting example of a method for stochastic optimization of a robust inference problem using a sampling device.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the singular forms "a," "an," and "the" include plural references unless the context clearly dictates otherwise. Any reference to "or" herein is intended to encompass "and/or" unless otherwise stated.

As disclosed herein, "variable" is equivalent to "argument" herein.

As disclosed herein, setting a value of a vector, e.g., a continuous vector or discrete vector can be setting values for every element of the vector. In other cases, setting a value of a vector can be setting values for one or more element of the vector.

Robust Inference Problems

In an aspect, the present disclosure provides methods and systems that utilize a sampling device within a stochastic optimization method for solving robust inference problems. The methods and systems may provide a framework that enables efficient and robust optimization techniques in machine learning methods. Nonlimiting examples of machine-learning methods include: structural support vector machines (SSVMs), semi-supervised learning, and active learning. These methods may be useful in applications such as natural language processing (e.g., noun phrase coreference resolution), computer vision and image processing (e.g., image segmentation, image tagging), and data science (e.g. clustering of documents, group detection in a crowd, recommender systems, semi-supervised, and active learning, etc).

The robust inference problems herein may be associated with the robustness and/or accuracy of inference or assumption(s) under which a solution may be found for a computational task. In other words, how much deviation(s) from the inference or assumption may occur under which a solution may be obtained. The robustness of an inference method may pertain to its resistance to outliers, such as by training models that increase the probability of or guarantee good performance even for non-ideal or least confident predictions. The robust inference problems may be expressed as in equation (1):

$$\min_{x \in C}\left(f(x) + \Sigma_{i_1}^{m_1} \Sigma_{i_2}^{m_2} \omega_{i_1 i_2} \max_{y \in Y_{i_1 i_2}} g_{i_1 i_2}(x, y)\right) \quad (1)$$

where $C \subseteq \mathbb{R}^n$ can be a set that defines admissible vectors in an n-dimensional real vector space; $f: \mathbb{R}^n \to \mathbb{R}$ can be a function mapping vectors in an n-dimensional real vector space to a real value; every $g_{i_1 i_2}: \mathbb{R}^n \times Y_{i_1 i_2} \to \mathbb{R}$ can be a real-valued function; $\omega_{i_1 i_2}$ can be real numbers, $Y_{i_1 i_2}$ can be sets of vectors (such as finite set of vectors) from which argument y can take values, $i_1$ and $i_2$ can be independent indexes in the range from 1 to $m_1$ and 1 to $m_2$, respectively, and x and y can be two arguments (such as two independent arguments) which may be any vector from C and $Y_{i_1 i_2}$, respectively. Optimization of the robust inference problems described herein may refer to solving a minimization problem as described in equation (1) or any other problem that may be equivalent to or can be described by equation (1). In some cases, the set C is a convex set, and the function $f(x)$ and all functions $g_{i_1,i_2}$ are convex, and all real numbers $\omega_{i_1,i_2}$ are positive. In such a case, the optimization problem described by equation (1) may become a convex optimization problem, allowing convex optimization methods to be employed in order to create convenient approximations of the global optimal solution. Such convex optimization methods may be efficiently implemented using procedures that scale with polynomial time. However, in other cases, the optimization problem may be non-convex. For example, when the real numbers $\omega_{i_1,i_2}$ may be negative, as in a latent SSVM optimization problem, the optimization problem can be non-convex. As another example, when the functions $g_{i_1,i_2}$ are non-convex, as in the case that the functions $g_{i_1,i_2}$ correspond to neural networks, the optimization problem in (1) can be non-convex.

Referring to one of the functions (e.g., objective functions or loss functions) $g_{i_1,i_2}(x, y)$ (also referred to as g(x, y) herein), the function $$g(x) := \max_{y \in Y} g(x, y)$$

may be only differentiable with respect to x where the max is uniquely attained. In the case when the max (e.g., $\max_{y \in Y} g(x, y)$) is not unique, g(x, y) may be only subdifferentiable, and the subdifferential may be given by equation (2) as follows:

$$\partial(x) = co\{\partial_x g(x, y) | \text{ for all } y \text{ such that } g(x,y) = g(x)\} \quad (2)$$

where co may be the notation for convex hull and $\partial_x$ may be the partial derivative with respect to x. Computing an element of this set (i.e., computing $\partial g(x)$) then may amount to solving the inner maximization problem in equaion (1)

$$\left(\text{i.e., } \max_{y \in Y_{i_1 i_2}} g_{i_2 i_2}(x, y)\right)$$

and differentiating g(x,y) with respect to x at points y that achieve a threshold or maximum value.

In some cases, the objective function or loss function g(x, y) can be any real valued function. In some cases, the objective function or loss function g(x, y) can be any real valued function with the second argumenty being a discrete and the first argument x being a discrete vector. In some cases, the objective function or loss function g(x, y) can be any real valued function with the second argumenty being a continuous vector and the first argument x being a discrete vector. In some cases, the objective function or loss function g(x, y) can be any real valued function with the second argumenty being a continuous vector and the first argument x being a continuous vector. In some cases, the objective function or loss function g(x, y) can be any real valued function with the second argumenty being a discrete vector and the first argument x being a continuous vector.

In some cases, the objective function or loss function g(x, y) may be linear in its second argument y. In some cases, the objective function or loss function g(x, y) may be quadratic in its second argument y. In the case that the objective function or loss function g (x, y) is quadratic in its second argument y, the inner maximization in equation (1) can be rephrased as a quadratic optimization problem (such as a quadratic optimization problem over binary variables) as in equation (3):

$$\max\{g(x,y)|y \in Y\} = \max\{\langle Q(x)z,z \rangle + \langle c(x),z \rangle | z \in \{0, 1\}^m\} \quad (3)$$

for some m and symmetric matrix Q (x) and vector c(x) that may depend on x, where the solution y on the left-hand-side expression of equation (3) can be constructed from the solution z on the right-hand side of equation (3). Here the variable z may correspond to an encoding (such as a binary encoding) of variable y. In some embodiments, an encoding as such can be given by a computable mapping z→y. Thus, a subgradient for g can be obtained by solving a quadratic optimization problem (such as a binary quadratic optimization problem).

Equation (1) can include a function $f(x)$, which may be a function of a continuous vector x wherein the continuous vector may be real-valued. The function $f(x)$ may regularize the optimization of equation (1). The function $f(x)$ may be an optional function and may take a value of zero for one or more possible values that variable x may take. For example, in structured support vector machines (SSVMs), $f(x)$ can be a regularizer, which may help to reduce overfitting.

In equation (1), x may be a first variable or argument that may take its value from the constraint set C, which may include real-values. The constraint set C may include a number of continuous vectors, the number may be any number that is no less than one. Each continuous vector may contain real-values. Optimization of the robust inference problems may include thresholding or minimization only with respect to x that is determined by y, while the vector(s) y can be "internal".

Data of the Robust Inference Problem

The methods for the stochastic optimization of robust inference problems described herein may include obtaining data of the robust inference problem. Such data may be pre-generated manually or automatically from raw data. Such data may be obtained by a digital computer. Such data may be utilized at least in part by the methods described herein for the stochastic optimization of robust inference problems, such as the robust inference problems described herein.

Such data of the robust inference problem may include initial values for one or more parameter(s) and/or argument (s) in equation (1) so that the iterative optimization process can start with the initial values.

Such data of the robust inference problem may include a set of objective functions or loss functions, wherein each objective function or loss function can be expressed as $g_{i_1,i_2}(x,y)$, wherein $i_1$ and $i_2$ are independent indices with index $i_1 \in \{1, \ldots, m_1\}$ and $i_2 \in \{1, \ldots, m_2\}$, x can be a continuous vector, and $y \in Y_{i_1 i_2}$ can be a discrete vector. The index $i_1$ may be a fixed number for one or more entire iterations of an optimization process selecting a non-overlapping subset of objective functions or loss functions, and it may be selected for other iterations based on predetermined selection procedure. The index $i_2$ may be an index over the number of objective functions or loss functions in each non-overlapping subset corresponding to index $i_1$.

The set of objective functions or loss functions may include one or more objective functions or loss functions. The set of objective functions or loss functions may include a plurality of objective functions or loss functions. In the case that only one objective function or loss function is contained in the set, the subset of objective functions or loss functions may be the set of objective functions or loss functions. In cases when the set of objective functions or loss functions includes two or more objective functions or loss functions, the set of objective functions or loss functions may be grouped into non-overlapping subsets. Each of the non-overlapping subsets of objective functions or loss functions may comprise only two objective functions or loss functions. Each subset may contain 1, 2, 3, 4, 5, 6, 10, 20, 30, 50, 60, 70, 80, 90 100, or more objective functions or loss functions. Each subset may contain at least about 1, 2, 3, 4, 5, 6, 10, 20, 30, 40, 50, 60, 70, 80, 90 100, or more objective functions or loss functions. In other cases, each subset may contain at most about 1, 2, 3, 4, 5, 6, 10, 20, 30, 40, 50, 60, 70, 80, 90 100, or less objective functions or loss functions. Among the set of objective functions or loss functions, each objective function or loss function may accept a first argument x and a second argumenty. The first and second arguments may be independent arguments. The first and second arguments may be dependent arguments. The first argument may take a continuous vector as its value, and the second argument may take a discrete vector as its value.

Such data of the robust inference problem may include a linear-combination weight for each objective function or loss function: each loss function in equation (1) may be weighted by a weight, which can be a scalar $w_{i_1,i_2}$ that influences its contribution to the overall sum.

Such data of the robust inference problem may include a set of permissible discrete vectors, $Y_{i_1 i_2}$, for each loss function from which variable y may take values.

Such data of the robust inference problem may include an initial continuous vector for the first argument of all loss functions in the first iteration. Such data of the robust inference problem may include an initial continuous vector for the first argument of one or more loss functions in the first iteration.

The methods of the robust inference problem may set the current values of a set of scaling parameters in the first iteration of the iterative optimization process to be initial values of the set of scaling parameters. The initial values may be based at least in part on a schedule described herein. In later iterations, the current values of the set of scaling parameters may be updated based at least in part on the schedule, as described herein.

The methods for solving the robust inference problem may receive or generate a schedule of the set of scaling parameters, from which the current values of the set of scaling parameters may be obtained from. The schedule may be determined a priori by the user or adjusted automatically by a selected algorithm. Initial values of the set of scaling parameters may be included in the schedule or based at least in part on the schedule. The schedule may be generated based on theoretical or empirical knowledge. The schedule may be generated using one or more algorithms or procedures selected from: a statistical algorithm or procedure, a pattern recognition algorithm or procedure, a machine learning algorithm or procedure, a deep learning algorithm or procedure, an artificial intelligence algorithm or procedure, a neural network, or the like. The schedule may be generated using historical values of the set of scaling parameters. The set of scaling parameters may take values of any real numbers. The set of scaling parameters may take values of any non-zero real numbers. The set of scaling parameters may take values of any positive and/or negative numbers.

The set of scaling parameters may be used in a "softmax function" for solving the robust inference problems herein. The "Softmax function" can approximate the "max" function in equation (1), e.g., $$\max_{y \in Y_{i_1,i_2}} g_{i_2,i_2}(x, y),$$

with a smooth function as in equation (4):

$$\max_{y \in Y_{i_1 i_2}} g_{i_1,i_2}(x, y) \approx (1/\beta) \log \Sigma_{y \in Y_{i_1 i_2}} \exp(\beta g_{i_1,i_2}(x, y)) \quad (4)$$

where x can be a continuous vector, $y \in Y_{i_1 i_2}$ can be a discrete vector such that the discrete vector is selected from a discrete set of permissible states, $Y_{i_1 i_2}$, from which variable y may take values, $g_{i_1,i_2}(x, y)$ can be an objective function or loss function wherein $i_1$ and $i_2$ may be dependent or independent indexes with index $i_1 \in \{1, \ldots, m_1\}$ and $i_2 \in \{1, \ldots, m_2\}$, and $\beta$ may be an element in the set of scaling parameters that obtains value from a schedule of a set of scaling parameters. In equation (4), $\beta$ may be the only element in the set of scaling parameters.

Those $\beta$ with higher values may enable better approximation of the "max" function on the left-hand side in equation (4) than lower values. However, higher values can slow down the generation of the samples as a tradeoff. If the optimization starts with a relatively low $\beta$ and increases it gradually, the optimization problem may be solved in fewer iterative steps than in the case of starting with a set of scaling parameters with higher values.

"Smooth-max" approximation, equivalent herein to a softmax approximation, as in equation (4), has the following beneficiary properties.

A max function $h(z)=\max\{z_1, \ldots, z_n\}$ can be approximated by the softmax function of equation (5):

$$h_\mu(z) = \mu \log \sum_{k=1}^n \exp\left(\frac{z_i}{\mu}\right) \quad (5)$$

where $\mu$ may be a positive parameter equivalent to $1/\beta$.

The max function $h(z)=\max\{z_1, \ldots, z_n\}$ may be composed with a set of functions (such as a set of nonlinear functions), and the max function and its smooth approximation may be considered together as in equations (4.1a) and (4.1b):

$$h(x) = \max_{i=1:m} g_i(x), \quad (4.1a)$$

$$h_\mu(x) = \mu \log \sum_{k=1}^m \exp\left(\frac{g_i(x)}{\mu}\right). \quad (4.1b)$$

The properties of this smooth approximation as in equation (4.1b) may depend on the smoothness properties of the component functions $g_i$. In the context of equation (1), we may index each element in Y by i=1:m, where m=|Y|, and so $g_i(x):=g(x,y_i)$, where $y_i \in Y$.

Referring to the objective functions or loss functions $g_{i_1,i_2}(x,y)$ indexed by $i_1 \in \{1, \ldots, m_1\}$ and $i_2 \in \{1, \ldots, m_2\}$, which are to be maximized, the softmax described herein can be applied to each of the objective functions or loss functions $g_{i_1,i_2}(x,y)$ separately with $y \in g_{i_1,i_2}$.

The functions, $g_i: \mathbb{R}^n \to X$, with $X \subseteq \mathbb{R}$ compact, may be convex and may have Lipschitz continuous gradients with constant $L_i$, and bounded norm $M_i := \max\{\|\nabla g_i(x)\|^2 | x \in X\}$, with $i=1: m$. Let $$L := \max_i L_i, \text{ and } M := \max_i M_i.$$

Then the functions described in equations (4.1a) and (4.1b) may satisfy one or more of the following three statements:
1. $h(x) + \mu \log(|\arg\max\{g_i(x)\}|) \le h_\mu(x) \le h(x) + \mu \log(m)$;
2. $h(x) - c_1 \mu \le h_\mu(x) \le h(x) + c_2 \mu \quad \forall \mu > 0$, where $c_i$ may be constants such that $c_1 + c_2 = \log(m)$; and 3. $\|\nabla h_\mu(x) - \nabla h_\mu(y)\| \le \left[\dfrac{M}{\mu} + L\right]\|x - y\|.$ The norms that appear in these statements may be 2-norm, even though the Lipschitz constant of the uncomposed smooth approximation may be stated in the infinity norm. The gradient of the smooth approximation given in equation (4.1b) may be given by:

$$\nabla h_\mu(x) = \sum_{i=1}^m p_i^\mu(x) \nabla g_i \text{ with } p_i^\mu(x) = \dfrac{\exp\left(\dfrac{g_i(x)}{\mu}\right)}{\sum_{k=1}^m \exp\left(\dfrac{g_i(x)}{\mu}\right)}, \quad (4.2)$$

where $\sum_{i=1}^m p_i^\mu(x) = 1$, and $p_i^\mu(x) \ge 0$. The gradient of the smooth approximation $h_\mu$ may be obtained as an average or weighted average of the gradients. Thus, the gradient of the approximation $h_\mu$ may be obtained as an expected value where $i$ may be a random variable. The gradient of the approximation $h_\mu$ may be obtained as an expected value where $i$ may be a random variable that follows a Boltzmann distribution given by equation (5):

$$i = \dfrac{\exp\left(\dfrac{g_i(x)}{\mu}\right)}{\sum_{k=1}^m \exp\left(\dfrac{g_i(x)}{\mu}\right)} \quad (5)$$

where $$\dfrac{1}{\mu}$$

may be the only element in a set of scaling parameters.

Iterative Optimization Process

The methods for stochastic optimization of robust inference problems may include iteratively performing one or more steps in each iteration of the iterative optimization process until at least one stopping criterion is met. Such stopping criterion may comprise a set of rules containing one or more rules for determining one or more of an accuracy, sensitivity, or specificity of a solution to the robust inference problem. The stopping criterion may be based at least in part on a magnitude of a distance between the current continuous vector in one iteration of the optimization process and the updated current continuous vectors in the same iteration or a different iteration, e.g., a previous or subsequent iteration.

In each iteration, the one or more steps in the iterative optimization process may include determining current values of the set of scaling parameters. The current values may be based at least in part on the schedule of the set of scaling parameters.

In each iteration, the one or more steps in the iterative optimization process may include selecting a subset of the objective functions or loss functions from the non-overlapping subsets, either non-repetitively or repetitively.

In each iteration, one or more sub-steps may be performed for each objective function or loss function of the selected subset of the objective functions or loss functions. The one or more sub-steps may include generating one or more samples of discrete vectors for variable or argument y in equation (1). Each sample of the one or more samples may be selected from the set of permissible discrete vectors associated with the specific objective function or loss function. Each sample of the one or more samples may be generated based on a probability distribution. In some cases, the probability distribution may be determined at least in part by the set of scaling parameters and the specific objective function or loss function. The first argument of the loss function may take the current value of the continuous vector in the iteration. For instances, each sample may be generated according the probability distribution in equation (6):

$$p_x^{(i_1,i_2)}(y) = \dfrac{\exp(\beta g_{i_1,i_2}(x,y))}{\sum_{y \in Y_{i_1,i_2}} \exp(\beta g_{i_1,i_2}(x,y))} \quad (6)$$

where x may be held as a fixed continuous vector for all the samples in each iteration and may be a scaling parameter. Each of the one or more samples may be generated using the sampling device disclosed herein. For example, a number of k samples may be generated and each sample may be selected from the set of permissible states so that k samples $(y_1, \ldots, y_k) \in Y_{i_1,i_2}$, and wherein a choice of $i_1 \in \{1, \ldots, m_1\}$ may represent the selected subset of the objective functions or loss functions, and $i_2 \in \{1, \ldots, m_2\}$ may represent the function in the selected subset. The probability distributions of the samples may be any single probability distribution or any combination of different probability distributions.

The sampling device herein may include a random or pseudo-random generator that produces samples distributed according to a Boltzmann model. Such a sampling device may include hardware (e.g., a specialized computing device, a quantum processor, a non-classical computer, a quantum computing system, a digital computer, a digital processing device, or the like) and/or software that is configured to perform "Boltzmann sampling." The approximated gradient then can be used to solve the robust inference problem with a pre-selected level of accuracy. The utilization of the sampling device and the connection of the sampling device may advantageously connect the gradient of the smoothed function approximation to a Boltzmann distribution, so that a complex robust inference problem can be solved. The sampling device may exhibit one or more properties determined by the mathematical definition of a Boltzmann distribution given in equation (6). The sampling device may include any hardware, software, or combination of hardware and software that may be configured to exhibit one or more properties determined by the mathematical definition of a Boltzmann distribution given in equation (6). In some cases, the normalized frequencies of observing different configurations fall within a selected distance from the mathematically defined probabilities given in equation (6) of the respective configurations. The one or more samples may be of the discrete vectors and/or may follow a Boltzmann distribution.

The systems for solving a robust inference problem may include a sampling device for generating a number of samples. The sampling device may comprise a quantum processor and a quantum device control system for obtaining the schedule of the set of scaling parameters, the data of the robust inference problem, or their combination. The quantum processor may be coupled to a digital computer and to the quantum device control system. The quantum processor can comprise a plurality of qubits and a plurality of couplers, each coupler of the plurality of couplers for providing a communicative coupling at a crossing of two qubits of the plurality of qubits. The digital computer may be remotely located with respect to the sampling device.

The quantum processor or quantum computer may comprise one or more adiabatic quantum computers, quantum gate arrays, one-way quantum computers, topological quantum computers, quantum Turing machines, superconductor-based quantum computers, trapped ion quantum computers, trapped atom quantum computers, optical lattices, quantum dot computers, spin-based quantum computers, spatial-based quantum computers, Loss-DiVincenzo quantum computers, nuclear magnetic resonance (NMR) based quantum computers, solution-state NMR quantum computers, solid-state NMR quantum computers, solid-state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, nitrogen vacancy (NV) diamond-based quantum computers, Bose-Einstein condensate-based quantum computers, transistor-based quantum computers, and rare-earth-metal-ion-doped inorganic crystal based quantum computers. The quantum processor or quantum computer may comprise one or more of: quantum annealers, Ising solvers, optical parametric oscillators (OPO), and gate models of quantum computing.

The quantum processor or quantum computer may comprise one or more qubits. The one or more qubits may comprise superconducting qubits, trapped ion qubits, trapped atom qubits, photon qubits, quantum dot qubits, electron spin-based qubits, nuclear spin-based qubits, molecular magnet qubits, fullerene-based qubits, diamond-based qubits, nitrogen vacancy (NV) diamond-based qubits, Bose-Einstein condensate-based qubits, transistor-based qubits, or rare-earth-metal-ion-doped inorganic crystal based qubits.

The sampling device may comprise a network of optical parametric oscillators, in which the network includes an optical device configured to receive energy from an optical energy source and generate a plurality of optical parametric oscillators; and a plurality of coupling devices, each of which controllably couples an optical parametric oscillator of the plurality of optical parametric oscillators. The sampling device may include a network of optical parametric oscillators simulating two-body, three-body, or many-body interactions via interference of the optical pulses relevant to a reference phase. The sampling device may include one or more physical system with tunable and/or controllable many-body interactions that can stay close to its thermal equilibrium or approach its steady states.

The systems for solving a robust inference problem may include a digital computer, or use of the same. The sampling device may include a digital computer, a central processing unit and a memory unit coupled to the central processing unit. The sampling device may include an application, a software module, a computer program, a user console, or use of the same, for obtaining the schedule of the scaling parameter, the data of the robust inference problem, or a combination thereof. The application, software module, or use of the same may be adapted for performing a Monte Carlo based algorithm. The Monte Carlo based algorithm may include Simulated Annealing, Simulated Quantum Annealing, Gibbs Sampling, or any combination thereof.

The sampling device may include a reconfigurable digital hardware, a central processing unit and a memory unit with the central processing unit and the memory unit coupled to the reconfigurable digital hardware. The reconfigurable digital hardware may be adapted for obtaining the schedule of the scaling parameter, the data of the robust inference problem or a combination thereof. The reconfigurable digital hardware may be adapted to perform a Monte Carlo based algorithm. The Monte Carlo based algorithm may include Simulated Annealing, Simulated Quantum Annealing, Gibbs Sampling, or any combination thereof.

Devices and systems for generating approximations of the Boltzmann distribution at one or more given or user-specified scaling parameter(s) can be used as a sampling device herein. The sampling device herein may be devices or systems that can utilize Simulated Annealing, Monte Carlo, and/or quantum Monte Carlo methods. The sampling device may include implemented algorithm(s) on a processor, a digital processing device, a digital computer, a CPU or any other customized hardware such as an field-programmable gate array (FPGA), a graphics processing unit (GPU), an application-specific integrated circuit (ASIC), or a combination thereof. The sampling device may include a quantum computing system based on quantum circuits, a computing device that carries physical and/or approximate realizations of quantum annealing or quantum adiabatic computation, or their combination.

The stochastic optimization of the robust inference problem herein may be associated with training a structured support vector machine (SSVM). The stochastic optimization of the robust inference problem may be associated with image segmentation, image tagging and/or recommendation system. The stochastic optimization of the robust inference problem may be associated with a dual of the basis pursuit problem from compressed sensing. The stochastic optimization of the robust inference problem may be associated with unsupervised learning, semi-supervised learning, supervised learning, and/or active learning.

The one or more sub-steps may include obtaining a gradient of the objective function or loss function taken with respect to the first argument x, wherein the first argument of the objective function or loss function may take the current values of the continuous vector, and the second argumenty of the objective function or loss function can take value of a selected sample. The k samples $(y_1, \ldots, y_k) \in y$ may be generated using a sampling device according to the probabilities using equation (6), where x may be held fixed. For each sample $y_j$, the index j can be in the range from 1 to k, and the gradient of the function $g_{i_1, i_2}(x, y_j)$ may be evaluated with respect to the continuous variables x evaluated at their current value. For that sample, $y_j$ may be generated using equation (7):

$$\mathrm{grad}_j^{(i_1, i_2)} := \nabla_x g_{i_1, i_2}(x, y_j), \forall j \in \{1, \ldots, k\} \qquad (7)$$

For example, if there may be a total number of k samples (k may be any integer number) for a selected objective function or loss function, k gradients can be generated with each gradient for one of the k samples. Each gradient may be obtained with the first argument x taking the same current continuous vector and the second argumenty of the objective function or loss function taking values of a selected sample. The gradient may be obtained using a digital computer using the samples generated by a sampling device. The sampling device may comprise a digital computer, a quantum computer, or any other digital processing device and/or devices. The other digital processing devices may include but are not limited to: a hybrid computer including at least a digital computer and a quantum computer.

The one or more sub-steps may include obtaining an average of the one or more gradients obtained in equation (7) using equation (8):

$$grad^{(i_1,i_2)} := \frac{1}{k}\sum_{j=1}^{k} grad_j^{(i_1,i_2)} \quad (8)$$

For example, if there are k gradients obtained for k samples, an average of the k gradients may be obtained. k may be an integer greater than one. If k equals one, the average of the one or more gradients may be equal to the single gradient.

In each iteration, the one or more steps in the iterative optimization process may include obtaining a summation and/or a partial summation of the averages of the one or more gradients, wherein the summation may be for all objective functions or loss functions in the selected subset of the objective functions or loss functions, and the partial summation may be for more than one objective functions or loss functions in the selected subset of the objective functions or loss functions. The summation and/or partial summation may be a linear combination of the gradient averages as in equation (9):

$$d^{(i_1)} := \sum_{i_2=2}^{m_2} \omega_{i_1,i_2} grad_j^{(i_1 i_2)} \quad (9)$$

For example, a selected subset of objective functions or loss functions may contain four objective functions or loss functions; and for each objective function or loss function, an average of gradients may be obtained. The summation herein may include adding up 4 different averages of gradients multiplied by its associated weight, while the partial summation herein may include adding up any 2 or 3 different averages of gradients multiplied by its associated weight. If there is only one objective function or loss function in the selected subset, the sum may be the average of gradients multiplied by its associated weight for the one objective function or loss function. A selected subset of objective functions or loss functions may contain at least about 1, 2, 3, 4, 5, 6, 7, 8, 9, 10, 20, 30, 40, 50, 60, 70, 80, 90, 100, or more objective functions or loss functions. A selected subset of objective functions or loss functions may contain at most about 100, 90, 80, 70, 60, 50, 40, 30, 20, 10, 9, 8, 7, 6, 5, 4, 3, 2, or 1 objective functions or loss functions. A selected subset of objective functions or loss functions may contain a number of objective functions or loss functions that is within a range defined by any two of the preceding values.

In each iteration, the one or more steps in the iterative optimization process may further include computing a search direction based at least in part on any one or more of: v1) the summation or partial summation of the averages of the one or more gradients (e.g., weighted summation or partial summation), v2) the current values of the set of scaling parameters, v3) at least part of a history of the summation or partial summation of the averages of the one or more gradients, and/or v4) at least part of a history of the values of the set of scaling parameters. The history of a specific element, e.g., the summation of the averages of the gradients herein can include current values of the specific element (for currently selected subset of the objective functions or loss functions) and/or previous values of the specific element (for previously selected subsets of the objective functions or loss functions). This search direction, or equivalently, descent direction −d, may depend on current $d^{(i_1)}$ and may additionally depend on previous calculations of $d^{(i_1)}$ for previous choices of $i_1$.

The one or more steps in the iterative optimization process may further include computing a step length a that ensures that the direction −d makes progress towards optimizing equation (1) or that tends to increase the probability that the direction −d makes progress towards optimizing equation (1). The step length may be computed based at least in part on one or more of: vi1) the current values of the set of scaling parameters, vi2) the selected subset of loss functions, vi3) at least part of a history of values of the set of scaling parameters, and/or vi4) at least part of a history of the selected subset of loss functions. The history of the selected subset of objective function or loss function herein can include current selected subset of objective functions or loss functions and/or one or more previously selected subsets of the objective functions or loss functions. The one or more steps in the iterative optimization process may further include computing an updated current continuous vector using the step length and the search direction, setting the current value of the continuous vector to be the updated current continuous vector. The update may be given by equation (10):

$$x \leftarrow \Pi_C(x-ad) \quad (10)$$

where $\Pi_S$ denotes projection on the constraint set C. The sequence of updates may converge to an approximate solution of equation (1).

FIG. 1 shows a flowchart for a non-limiting example of a method 100 for stochastic optimization of a robust inference problem using a sampling device. In a first operation 102, the method 100 may comprise receiving (for instance, by a digital computer data of the robust inference problem. The data may comprise a set of objective functions or loss functions grouped into non-overlapping subsets. Each objective function or loss function in the set of loss functions may accept first and second arguments. The data may further comprise: a set of permissible vectors for each objective function or loss function in the set of objective functions or loss functions.

In a second operation 104, the method 100 may comprise setting (for instance, by the digital computer), a current value of a continuous vector.

In a third operation 106, the method 100 may comprise receiving (for instance, by the digital computer), a schedule of a set of scaling parameters.

In a fourth operation 108, the method 100 may comprise determining current values of the set of scaling parameters based at least in part on the schedule.

In a fifth operation 110, the method 100 may comprise selecting a subset of the objective functions or loss functions from the non-overlapping subsets.

In a sixth operation 112, the method 100 may comprise iterating a series of steps to obtain one or more gradients for each objective function or loss function of the objective functions or loss functions. The series of steps may comprise generating, by the sampling device, one or more samples of vectors from a set of permissible vectors associated with the objective function or loss function. The series of steps may comprise obtaining (for instance, by the digital computer) one or more gradients. Each of the one or more gradients may be of the objective function or loss function taken with respect to the first argument. The series of steps may comprise obtaining (for instance, by the digital computer) an average of the one or more gradients.

In a seventh operation 114, the method 100 may comprise obtaining (for instance, by the digital computer) a summation or partial summation of the averages of the one or more gradients. The summation may be for all objective functions or loss functions in the selected subset of objective functions or loss functions. The partial summation may be for more than one objective function or loss function in the selected subset of objective functions or loss functions.

In an eighth operation 116, the method 100 may comprise computing (for instance, by the digital computer) a search direction. The search direction may be based at least in part on one or more of: v1) the summation or the partial summation of the averages of the one or more gradients; v2) the current values of the set of scaling parameters; v3) at least part of a history of the summation or partial summation of the averages of the one or more gradients; and v4) at least part of a history of the values of the set of scaling parameters.

In a ninth operation 118, the method 100 may comprise computing (for instance, by the digital computer) a step length. The step length may be based at least in part on one or more of: vi1) the current values of the set of scaling parameters; vi2) the selected subset of the objective functions or loss functions; vi3) at least part of a history of values of the set of scaling parameters; and vi4) at least part of a history of the selected subset of the objective functions or loss functions.

In a tenth operation 120, the method 100 may comprise setting (for instance, by the digital computer) the current value of the continuous vector based on the step length and the search direction.

In an eleventh operation 122, the method 100 may comprise providing the current value of the continuous vector.

Any 1, 2, 3, 4, 5, 6, 7, or 8 of the fourth operation 108, fifth operation 110, sixth operation 112, seventh operation 114, eighth operation 116, ninth operation 118, tenth operation 120, and eleventh operation 122 may be repeated until a stopping criterion is met. The stopping criterion may be any stopping criterion described herein.

The objective functions or loss functions may comprise one or more composite functions of the first and second arguments. Obtaining (for instance by the digital computer) one or more gradients, wherein each of the one or more gradients may be of the objective function or loss function taken with respect to the first argument may comprise iterative applications of a chain rule. The iterative applications of the chain rule may be performed using auto-differentiation. One or more argument functions of the composite functions may comprise differentiable feature extractors. The differentiable feature extractors may comprise deep neural networks.

Computing (for instance, by the digital computer) a search direction may comprise using one or more of stochastic gradient descent (SGD), stochastic average gradient methods (SAG and SAGA), stochastic variance-reduced gradient (SVRG), and/or stochastic dual coordinate ascent (SDCA).

Computing (for instance, by the digital computer) the step length may comprise using one or more adaptive gradient descent methods. The adaptive gradient descent methods may comprise Adaptive Moment Estimation (Adam), reduced mean square (RMS), Root Mean Square Propagation (RMSProp), and/or adaptive gradient algorithm (AdaGrad).

The sampling device may comprise a quantum processor and a quantum device control system for obtaining the schedule of the set of scaling parameters and the data of the robust inference problem. The quantum processor may be coupled to the digital computer and to the quantum device control system. The quantum processor may comprise any quantum processor or quantum computer described herein. The quantum processor may comprise a plurality of qubits and a plurality of couplers. Each coupler of the plurality of couplers may be for providing a communicative coupling at a crossing of two qubits of the plurality of qubits. The one or more samples of vectors may follow a Boltzmann distribution. The sample device may be a network of optical parametric oscillators. The network may comprise an optical device configured to receive energy from an optical energy source and generate a plurality of optical parametric oscillators and a plurality of coupling devices, each of which controllably couples an optical parametric oscillator of the plurality of optical parametric oscillators. The sampling device may comprise a central processing unit and a memory unit coupled to the central processing unit. The memory unit may comprise an application for obtaining the schedule of the scaling parameter and the data of the robust inference problem, and the application may be configured to implement a Markov Chain Monte Carlo algorithm. The sampling device may comprise a reconfigurable digital hardware, a central processing unit and a memory unit. The central processing unit and the memory unit may be coupled to the reconfigurable digital hardware. The reconfigurable digital hardware may be configured to obtain the schedule of the scaling parameter and the data of the robust inference problem, and the reconfigurable digital hardware may be configured to implement a Markov Chain Monte Carlo algorithm. The Markov Chain Monte Carlo algorithm may comprise simulated quantum annealing. The Markov Chain Monte Carlo algorithm may comprise simulated annealing. The Markov Chain Monte Carlo algorithm may comprise Gibbs sampling.

The set of objective functions or loss functions may comprise one or more objective functions or loss functions. The subset of the non-overlapping subsets of objective functions or loss functions may comprise only two objective functions or loss functions.

The stochastic optimization of the robust inference problem may be associated with training a structured support vector machine. The data of the robust inference problem may be associated with an image segmentation problem. The data of the robust inference problem may be associated with a dual of a basis pursuit problem from a compressed sensing problem. The data of the robust inference problem may be associated with semi-supervised learning. The data of the robust inference problem may be obtained from a noun phrase co-reference resolution problem. The data of the robust inference problem may be associated with active learning. The data of the robust inference problem may be associated with an image tagging problem. The data of the robust inference problem may be associated with a recommender system.

The schedule of the set of scaling parameters may be determined by a user or automatically by an algorithm.

The stopping criterion may be based at least in part on a magnitude of a distance between the current and the updated current vectors. The first and second arguments may be independent, and the first argument may employ a continuous vector as its value, the second argument may employ a discrete vector as its value, and the set of permissible vectors may comprise a set of permissible discrete vectors.

Many variations, alterations, and adaptations based on method 100 provided herein are possible. For example, the order of the operations of the method 100 may be changed, some of the operations removed, some of the operations duplicated, and additional operations added as appropriate. Some of the operations may be performed in succession. Some of the operations may be performed in parallel. Some of the operations may be performed once. Some of the operations may be performed more than once. Some of the operations may comprise sub-operations. Some of the operations may be automated and some of the operations may be manual.

Figure 2:
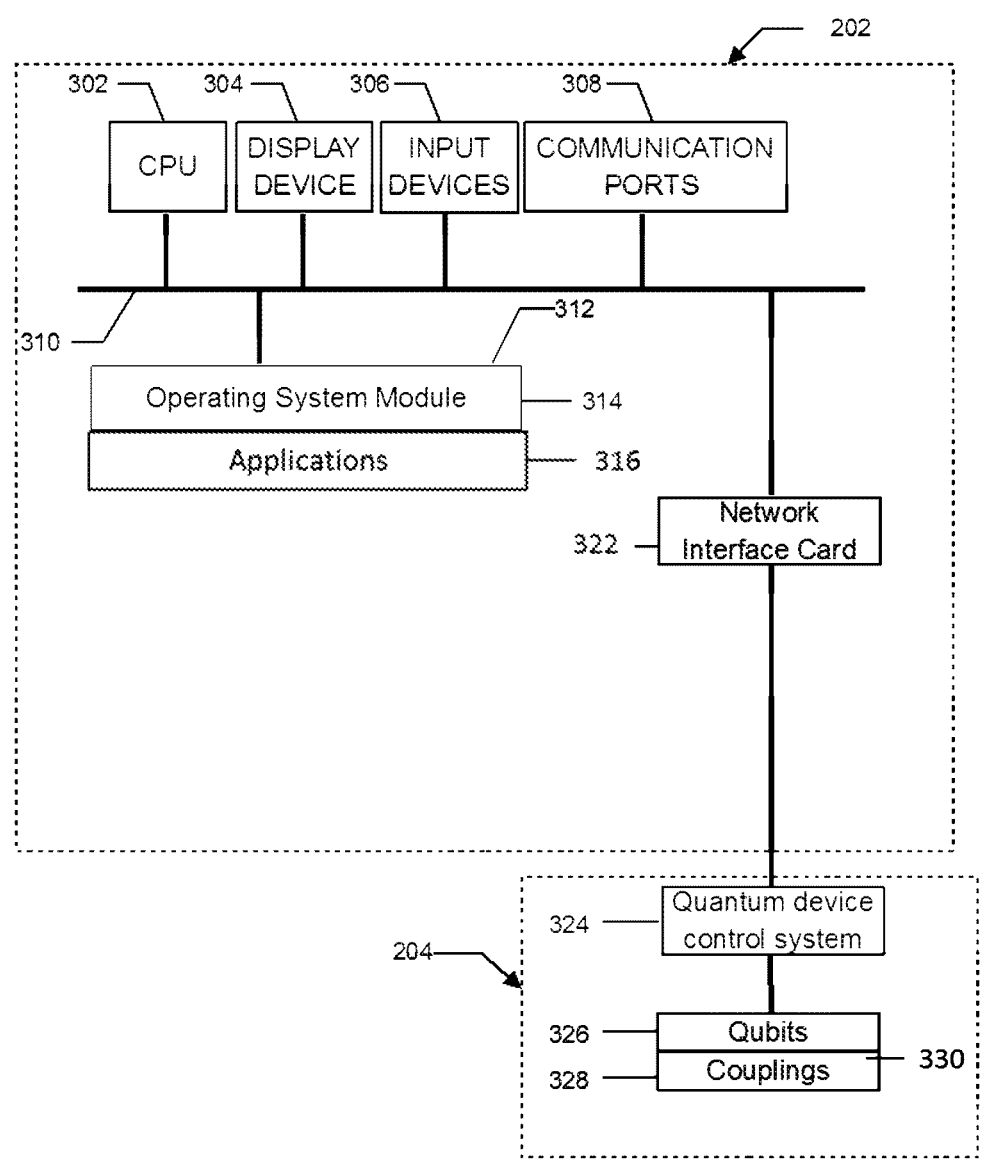
FIG. 2 shows a non-limiting example of a system for stochastic optimization of a robust inference problem.

FIG. 2 schematically illustrates a non-limiting example of a system 200 for stochastic optimization of a robust inference problem using a sample device. The system may comprise a digital computer interacting with a quantum computing system. The system 200 can comprise a digital computer 202 and non-classical computing system, which may be a quantum computing system 204. The system 200 may implement the method 100 of FIG. 1. The system 200 may be, for example, as described in U.S. Patent Publication Nos. 2017/0357539 and 2018/0091440, each of which is entirely incorporated herein by reference. The quantum computing system 204 may include one or more superconducting qubits. The quantum computing system may comprise any quantum computer or quantum processor described herein. The quantum computing system may comprise any quantum computing qubits described herein. The digital computer 202 may communicate (e.g., via direct communication or over a network) with the quantum computing system 204 by transmitting and/or receiving data therefrom. The digital computer and the qubits may be remotely located from each other. The digital computer and the qubits may be remotely locally to one another. In some embodiments, the digital computer 202 may be any type. The digital computer 202 may be a desktop computer, laptop computer, tablet personal computer, server, or smartphone. The digital computer 202 may comprise a central processing unit (CPU) 302, also referred to as a microprocessor, a display device 304, input devices 306, communication ports 308, a data bus 310, a memory unit 312 and a network interface card (NIC) 322. The CPU 302 may be a single core or multi-core processor. The digital computer 202 may include a plurality of processors for parallel processing.

The display device 304 can include a user interface (UI). Examples of UI's include, without limitation, a graphical user interface (GUI) and web-based user interface.

The CPU 302 may be used for processing computer instructions. Various embodiments of the CPU 302 may be provided. The central processing unit 302 may be a CPU Core i7-3820 running at 3.6 GHz and manufactured by Inter™, for example.

The display device 304 can be used for displaying data to a user. The skilled addressee will appreciate that various types of display device 304 may be used. The display device 304 may be a liquid-crystal display (LCD) monitor. The display device 304 may have a touchscreen, such as, for example, a capacitive or resistive touchscreen.

The communication ports 308 may be used for sharing data with the digital computer 202. The communication ports 308 may comprise, for instance, a universal serial bus (USB) port for connecting a keyboard and a mouse to the digital computer 202. The communication ports 308 may further comprise a data network communication port such as an IEEE 802.3 port for enabling a connection of the digital computer 202 with another computer via a data network. The skilled addressee will appreciate that various alternative embodiments of the communication ports 308 may be provided. The communication ports 308 may comprise an Ethernet port and a mouse port.

The memory unit 312 may be used for storing computer-executable instructions. The memory unit 312 may comprise an operating system module 314. The operating system module 314 may be of various types. In some embodiments, the operating system module 314 may be OS X Yosemite manufactured by Apple™.

The memory unit 312 can further comprise one or more applications. One or more of the central processing unit 302, the display device 304, the input devices 306, the communication ports 308 and the memory unit 312 may be interconnected via the data bus 310.

The system 202 may further comprise a network interface card (NIC) 322. The application 320 can send the appropriate signals along the data bus 310 into NIC 322. NIC 322, in turn, may send such information to quantum device control system 324.

The quantum computing system 204 may comprise a plurality of qubits and a plurality of coupling devices. Further description of the quantum computing system 204 is disclosed in, for example, U.S. Patent Publication No. 2006/0225165, which is entirely incorporated herein by reference.

The quantum computing system 204 of the quantum computing device can further comprise a quantum device control system 324 and a quantum processor or a quantum computer 330. The control system 324 may comprise coupling controller for each coupling in the plurality 328 of couplings of the quantum computing system 204 capable of tuning the coupling strengths of a corresponding coupling, and local field bias controller for each qubit in the plurality 326 of qubits of the quantum computing system 204 capable of setting a local field bias on each qubit.

Methods described herein can be implemented by way of machine (e.g., computer processor) executable code stored on an electronic storage location of the computer system 200, such as, for example, on the memory unit 312 or an electronic storage unit. The machine executable or machine readable code can be provided in the form of software. During use, the code can be executed by the CPU 302. In some cases, the code can be retrieved from the electronic storage unit and stored on the memory unit 312 for ready access by the CPU 302. In some situations, the electronic storage unit can be precluded, and machine-executable instructions are stored on memory unit 312.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired electrical and/on optical landline networks and/or over various air-links. The physical elements that carry such waves, such as wired or wireless links, electrical links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

As used in this specification and the claims, unless otherwise stated, the term "about," "substantially," and "approximately" refers to variations of less than or equal to +/−1%, +/−2%, +/−3%, +/−4%, +/−5%, +/−6%, +/−7%, +/−8%, +/−9%, +/−10%, +/−11%, +/−12%, +/−14%, +/−15%, or +/−20% of the numerical value depending on the embodiment. As a non-limiting example, about 100 meters represents a range of 95 meters to 105 meters (which is +/−5% of 100 meters), 90 meters to 110 meters (which is +/−10% of 100 meters), or 85 meters to 115 meters (which is +/−15% of 100 meters) depending on the embodiments.

Methods and systems of the present disclosure may be combined with or modified by other methods and systems, such as those described in U.S. Patent Publication Nos. 2017/0357539 and 2018/0091440, each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for training a machine learning model based at least in part on solving an optimization problem using a digital computer and a sampling device, said method comprising:
    (a) receiving, by said digital computer, data corresponding to said optimization problem, said data comprising one or more objective functions, wherein an objective function of said one or more objective functions is configured to accept at least an outer optimization argument of said objective function and an inner optimization argument of said objective function, wherein said outer optimization argument is representative of model trainable parameters of said machine learning model; and
    (b) training, by said digital computer, said machine learning model at least in part by:
        (i) providing values of said inner optimization argument of said objective function to said sampling device, wherein said sampling device comprises at least one non-classical computer, and wherein said sampling device is configured to generate one or more samples based at least in part on said inner optimization argument;
        (ii) receiving said one or more samples from said sampling device;
        (iii) using said one or more samples to perform an inner optimization over said inner optimization argument of said objective function to generate an inner optimization result;
        (iv) determining one or more gradients or sub-gradients of said objective function based at least in part on said inner optimization result;
        (v) performing one or more classical optimization protocols based at least in part on said one or more gradients or sub-gradients to thereby obtain an outer optimization over said outer optimization argument;
        (vi) outputting an outer optimization result for said machine learning model; and
        (vii) updating said model trainable parameters based at least in part on said outer optimization result to train said machine learning model.

2. The method of claim 1, further comprising repeating (b) in an iterative manner until a stopping criterion is met.

3. The method of claim 1, wherein said one or more objective functions comprise a loss function.

4. The method of claim 1, wherein said objective function comprises one or more composite functions of said outer optimization argument and said inner optimization argument.

5. The method of claim 1, wherein (b)(iv) is performed by one or more applications of a chain rule.

6. The method of claim 5, wherein said one or more applications comprise one or more iterative applications of said chain rule.

7. The method of claim 6, wherein said one or more applications are performed using auto-differentiation.

8. The method of claim 4, wherein one or more argument functions of said one or more composite functions comprises one or more differentiable feature extractors.

9. The method of claim 8, wherein said one or more differential feature extractors comprise one or more deep neural networks.

10. The method of claim 1, wherein said data further comprises a set of permissible values for said inner optimization argument.

11. The method of claim 10, wherein (b) comprises using said sampling device to generate said one or more samples from said set of permissible values.

12. The method of claim 10, further comprising generating said one or more samples based at least in part on a probability distribution.

13. The method of claim 12, wherein said probability distribution is determined at least in part by said objective function and a set of scaling parameters.

14. The method of claim 1, wherein (b)(v) comprises applying one or more members selected from the group consisting of a stochastic gradient descent (SGD) method, a stochastic average gradient (SAG or SAGA) method, a stochastic variance-reduced gradient descent (SVRG) method, a stochastic dual coordinate ascent (SDCA) method, an adaptive moment estimation (Adam) method, a reduced mean square (RMS) method, a root mean square propagation (RMSProp) method, and an adaptive gradient algorithm (AdaGrad).

15. The method of claim 1, wherein said at least one non-classical computer comprises at least one quantum computer.

16. The method of claim 1, wherein said at least one non-classical computer comprises at least one quantum annealer.

17. The method of claim 1, wherein said digital computer is remotely-located with respect to said sampling device.

18. The method of claim 1, wherein said sampling device comprises one or more optical parametric oscillators.

19. The method of claim 1, wherein said optimization problem comprises a non-convex problem.

20. The method of claim 1, wherein said sampling device comprises reconfigurable digital hardware configured to perform a Markov chain Monte Carlo procedure.

21. The method of claim 20, wherein said Markov chain Monte Carlo procedure comprises one or more members selected from the group consisting of a simulated annealing procedure, a simulated quantum annealing procedure, and a Gibbs sampling procedure.

22. The method of claim 1, wherein said optimization problem is associated with training a structured support vector machine (SVM).

23. The method of claim 1, wherein said data corresponding to said optimization problem is associated with one or more members selected from the group consisting of an image segmentation problem, a compressed sensing problem, a basis pursuit problem from a compressed sensing problem, a dual of a basis pursuit problem from a compressed sensing problem, a semi-supervised learning problem, a noun phrase co-reference resolution problem, an active learning problem, an image tagging problem, and a recommender system.

24. The method of claim 1, wherein said sampling device further comprises at least one digital computer, field-programmable gate array, graphics processing unit, or application-specific integrated circuit.

25. The method of claim 1, further comprising using said outer optimization result of said outer optimization for performing one or more operations in an iterative optimization process in machine learning.

26. A system for training a machine learning model based at least in part on solving an optimization problem, comprising a digital computer and a sampling device, wherein said digital computer is configured to at least:
 (a) receive data corresponding to said optimization problem, said data comprising one or more objective functions, wherein an objective function of said one or more objective functions is configured to accept at least an inner optimization argument and an outer optimization argument, wherein said outer optimization argument is representative of model trainable parameters of said machine learning model; and
 (b) train said machine learning model at least in part by:
  (i) providing values of said inner optimization argument of said objective function to said sampling device, wherein said sampling device comprises at least one non-classical computer, and wherein said sampling device is configured to generate one or more samples based at least in part on said inner optimization argument,
  (ii) obtaining, via an inner optimization, an inner optimization result over said inner optimization argument of said objective function from said sampling device,
  (iii) determining one or more gradients or sub-gradients of said objective function based at least in part on said inner optimization,
  (iv) performing one or more classical optimization protocols based at least in part on said one or more gradients or sub-gradients to thereby obtain an outer optimization result over said outer optimization argument,
  (v) output said outer optimization result for said machine learning model, and
  (vi) updating said model trainable parameters based at least in part on said outer optimization result to train said machine learning model.

27. The method of claim 1, wherein said one or more samples comprise samples of discrete vectors distributed according to a Boltzmann distribution.

28. The method of claim 1, wherein performing said inner optimization in (b) (iii) uses a smoothed maximum function.

29. The system of claim 26, wherein said digital computer is further configured to use said outer optimization result of said outer optimization for performing one or more operations in an iterative optimization process in machine learning.

30. The system of claim 29, wherein said sampling device further comprises at least one digital computer, field-programmable gate array, graphics processing unit, or application-specific integrated circuit.

31. The system of claim 29, wherein said non-classical computer comprises at least one quantum computer or at least one quantum annealer.

* * * * *